(12) United States Patent
Kinuta

(10) Patent No.: US 12,095,306 B2
(45) Date of Patent: Sep. 17, 2024

(54) UNINTERRUPTIBLE POWER SUPPLY APPARATUS AND CONTROL DEVICE FOR UNINTERRUPTIBLE POWER SUPPLY APPARATUS

(71) Applicant: FUJI ELECTRIC CO., LTD., Kawasaki (JP)

(72) Inventor: Takahiro Kinuta, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 52 days.

(21) Appl. No.: 17/972,148

(22) Filed: Oct. 24, 2022

(65) Prior Publication Data

US 2023/0045285 A1 Feb. 9, 2023

Related U.S. Application Data

(63) Continuation of application No. PCT/JP2021/039147, filed on Oct. 22, 2021.

(30) Foreign Application Priority Data

Nov. 12, 2020 (JP) .................. 2020-188995

(51) Int. Cl.
   *H02J 9/06* (2006.01)
(52) U.S. Cl.
   CPC .................. *H02J 9/062* (2013.01)
(58) Field of Classification Search
   CPC ........................................ H02J 9/062
   USPC ......................................... 307/23
   See application file for complete search history.

(56) References Cited

U.S. PATENT DOCUMENTS

| | | | |
|---|---|---|---|
| 2019/0165552 | A1 | 5/2019 | Kin et al. |
| 2021/0021152 | A1 | 1/2021 | Kurozaki et al. |
| 2021/0384711 | A1 | 12/2021 | Kwon et al. |

FOREIGN PATENT DOCUMENTS

| | | | |
|---|---|---|---|
| JP | H03-206586 | A | 9/1991 |
| JP | H09-298371 | A | 11/1997 |
| JP | 6597929 | B1 | 10/2019 |
| JP | 2020-078214 | A | 5/2020 |
| WO | 2018030035 | A1 | 2/2018 |
| WO | 2020060061 | A1 | 3/2020 |

OTHER PUBLICATIONS

English translation of JP 2021-019367 (Oct. 30, 2019), downloaded from https://worldwide.espacenet.com, Feb. 7, 2024. (Year: 2019).*
PCT/ISA/210, "International Search Report for PCT International Application No. PCT/JP2021/039147," Nov. 16, 2021.
(Continued)

*Primary Examiner* — Hal Kaplan
(74) *Attorney, Agent, or Firm* — HAUPTMAN HAM, LLP

(57) ABSTRACT

This uninterruptible power supply apparatus includes an uninterruptible power supply module, an input module, and a control module that is disposed in a left-right direction of the input module. The control module is configured such that at least arrangement positions of the thyristor unit and the control unit that controls power conversion of the uninterruptible power supply module are interchangeable in a left-right direction, in the housing.

11 Claims, 16 Drawing Sheets

(56) References Cited

OTHER PUBLICATIONS

PCT/ISA/237, "Written Opinion for PCT International Application No. PCT/JP2021/039147," Nov. 16, 2021.
Japan Patent Office, "Office Action for Japanese Patent Application 2021-167667," Jun. 28, 2022.
Japan Patent Office, "Office Action for Japanese Patent Application 2022-520738," Jun. 28, 2022.

\* cited by examiner

UNINTERRUPTIBLE POWER SUPPLY APPARATUS AND CONTROL DEVICE FOR UNINTERRUPTIBLE POWER SUPPLY APPARATUS

CROSS-REFERENCE TO RELATED APPLICATION

This application is a continuation of PCT application PCT/JP2021/039147, filed on Oct. 22, 2021, which claims priority of Japanese Patent Application No. 2020-188995 filed on Nov. 12, 2020, disclosure of which is incorporated herein.

BACKGROUND OF THE INVENTION

Field of the Invention

The present invention relates to an uninterruptible power supply apparatus and a control device for an uninterruptible power supply apparatus, and particularly to an uninterruptible power supply apparatus and a control device for an uninterruptible power supply apparatus that have a plurality of thyristors which is provided so as to correspond to respective phases of power received from an AC power supply for bypass power supply.

Description of the Background Art

Conventionally, an uninterruptible power supply apparatus having a plurality of thyristors that is provided so as to correspond to respective phases of power received from an AC power supply for bypass power supply (bypass input power supply) is known. Such an uninterruptible power supply apparatus is disclosed in, for example, JP-A-2020-78214.

JP-A-2020-78214 discloses an uninterruptible power supply apparatus including a power conversion unit that converts power received from an AC power supply, and a bypass circuit that is used to supply power received from a bypass input power supply when the uninterruptible power supply apparatus is stopped, such as maintenance. The bypass circuit includes a plurality of thyristors that is provided so as to correspond to respective phases of the power received from the bypass input power supply provided outside the apparatus, and is provided in parallel with the power conversion unit.

Here, although not specified in JP-A-2020-78214, in the uninterruptible power supply apparatus as described in JP-A-2020-78214, the power conversion unit and the thyristors of the bypass circuit may be housed in modules independent of each other. In this case, an input module in which wiring lines electrically connected to the bypass input power supply (AC power supply for bypass power supply) provided outside the apparatus are provided therein is provided on a side opposite to a side on which a module where the power conversion unit is housed is disposed, in a left-right direction of a module in which the thyristors are housed. Further, although not described in JP-A-2020-78214, in such a conventional uninterruptible power supply apparatus, the thyristors of the bypass circuit and a device other than the thyristor, such as a control board that controls power conversion, may be housed in the same module.

However, in the uninterruptible power supply apparatus as described above, in a case where the thyristors are disposed on the side opposite to the side on which the input module is disposed, inside the module in which the thyristors are housed, lengths of wiring lines that connect the thyristors and the wiring lines provided inside the input module and electrically connected to the bypass input power supply (AC power supply for bypass power supply) increase. Further, in a case where an arrangement position of the device other than the thyristor, such as the control board, is located on the side on which the input module is disposed with respect to an arrangement position of the thyristors, inside the module in which the thyristors are housed, the lengths of the wiring lines that connect the thyristors and the wiring lines provided inside the input module and electrically connected to the AC power supply for bypass power supply increase in order to avoid the device other than the thyristor, such as the control board. For this reason, there is a demand for an uninterruptible power supply apparatus capable of making the wiring lines more compact by restraining the lengths of the wiring lines that connect the thyristors and the wiring lines provided inside the input module and electrically connected to the AC power supply for bypass power supply from increasing, regardless of whether the input module is disposed on the left or right side of the module in which the thyristors are housed.

SUMMARY OF THE INVENTION

The present invention has been made in order to solve the above-described problem, and an object of the present invention is to provide an uninterruptible power supply apparatus and a control device for an uninterruptible power supply apparatus capable of making wiring lines more compact by restraining lengths of wiring lines that connect thyristors and wiring lines provided inside an input module and electrically connected to an AC power supply for bypass power supply from increasing, regardless of whether the input module is disposed on a left or right side of a module in which the thyristors are housed.

In order to achieve the above object, according to a first aspect of the present invention, there is provided an uninterruptible power supply apparatus including: an uninterruptible power supply module that includes a power conversion unit which converts power received from an AC power supply provided outside the apparatus; an input module that inputs power received from an AC power supply for bypass power supply provided outside the apparatus to a plurality of thyristors that is provided so as to correspond to respective phases of the power received from the AC power supply for bypass power supply provided outside the apparatus; and a control module that includes a thyristor unit which has the plurality of thyristors, a control unit which controls power conversion of the uninterruptible power supply module, and a housing which houses the thyristor unit and the control unit, and that is disposed in a left-right direction of the input module, in which the control module is configured such that at least arrangement positions of the thyristor unit and the control unit are interchangeable in a left-right direction, in the housing.

In the uninterruptible power supply apparatus according to the first aspect, as described above, the control module is disposed in the left-right direction of the input module that inputs the power received from the AC power supply for bypass power supply provided outside the apparatus to the plurality of thyristors. The control module is configured such that at least the arrangement positions of the thyristor unit and the control unit are interchangeable in the left-right direction, in the housing. With this, since the arrangement positions of the thyristor unit and the control unit can be interchanged in the left-right direction, the thyristor unit can be disposed on a side close to the input module. Therefore, the thyristor unit having the plurality of thyristors can be disposed on a side on which the input module that inputs the power received from the AC power supply for bypass power supply provided outside the apparatus to the plurality of thyristors is disposed, regardless of whether the input module is disposed on a left or right side of the control module. As a result, it is possible to make wiring lines more compact by restraining lengths of wiring lines that connect the thyristors and wiring lines provided inside the input module and electrically connected to the AC power supply for bypass power supply from increasing, regardless of whether the input module is disposed on the left or right side of the module (control module) in which the thyristors are housed.

In the uninterruptible power supply apparatus according to the first aspect, preferably, the control module is disposed between the uninterruptible power supply module and the input module, and the arrangement positions of the thyristor unit and the control unit in the housing are interchangeable such that the thyristor unit is disposed on a side of the input module, in the housing of the control module. With this configuration, since the arrangement positions can be interchanged such that the thyristor unit is disposed on the side of the input module, in the housing of the control module, the thyristor unit having the plurality of thyristors can be disposed on the side on which the input module is disposed regardless of whether the control module is disposed on the left or right side of the input module. As a result, it is possible to make the wiring lines more compact by restraining the lengths of the wiring lines that connect the plurality of thyristors and the wiring lines provided inside the input module and electrically connected to the AC power supply for bypass power supply from increasing.

In this case, preferably, the arrangement positions of the thyristor unit and the control unit in the housing are interchangeable such that the thyristor unit is disposed on the side of the input module in a state in which the plurality of thyristors is arranged in an up-down direction, in the housing of the control module.

With this configuration, since the plurality of thyristors is disposed on the side of the input module in a state in which the plurality of thyristors is arranged in the up-down direction, in the housing of the control module, all the thyristors can be brought close to the input module, unlike a case where the plurality of thyristors is disposed on the side of the input module in a state in which the plurality of thyristors is arranged in the left-right direction. As a result, it is also possible to make the wiring lines more compact by restraining the lengths of the wiring lines between all the thyristors provided in the thyristor unit and the wiring lines provided inside the input module and electrically connected to the AC power supply for bypass power supply from increasing. Further, since the plurality of thyristors are disposed on the side of the input module in a state in which the plurality of thyristors is arranged in the up-down direction, in the housing of the control module, it is possible to restrain a width of the control module in the left-right direction from increasing, unlike a case where the plurality of thyristors is disposed on the side of the input module in a state in which the plurality of thyristors is arranged in the left-right direction. As a result, an installation length of the control module in the left-right direction can be reduced.

In the configuration in which the plurality of thyristors is disposed on the side of the input module in a state in which the plurality of thyristors is arranged in the up-down direction, preferably, the control module further includes a circuit breaker that is provided in a current path between the plurality of thyristors and the power conversion unit and that is used to interrupt power output from the power conversion unit, and an arrangement position of the circuit breaker in the housing of the control module is changeable such that the circuit breaker is disposed above the plurality of thyristors of the thyristor unit and on the side of the input module with respect to the control unit. With this configuration, it is possible to make the wiring lines more compact by restraining the lengths of the wiring lines that connect the plurality of thyristors and the circuit breaker from increasing, as compared with a case where the control unit is disposed between the circuit breaker and the plurality of thyristors.

In the uninterruptible power supply apparatus according to the first aspect, preferably, the control unit includes a plurality of control boards aligned in an up-down direction and is configured to have a smaller width in the left-right direction than a width of the thyristor unit in the left-right direction. With this configuration, since the width of the control unit in the left-right direction is smaller than the width of the thyristor unit in the left-right direction, it is possible to restrain the width of the control module in the left-right direction from increasing. As a result, the installation length of the control module in the left-right direction can be reduced. Further, since the plurality of control boards are aligned in the up-down direction in the control unit, it is possible to easily restrain the width of the control unit from increasing, as compared with a case where the plurality of control boards is aligned in the left-right direction.

In this case, preferably, the control module further includes a first support member that supports the thyristor unit, a support member attachment portion to which a side of the first support member on a side of the uninterruptible power supply module is attached, and a left-right position change portion capable of changing a position of the support member attachment portion in the left-right direction between a first position on one side in the left-right direction and a second position on the other side in the left-right direction, in which in a case where the input module is disposed on one side in the left-right direction of the control module, the position of the support member attachment portion is changed to the second position, and in a case where the input module is disposed on the other side in the left-right direction of the control module, the position of the support member attachment portion is changed to the first position. With this configuration, the position of the support member attachment portion is changed to the first position or the second position by the left-right position change portion, so that it is possible to change the position of the first support member on the side of the uninterruptible power supply module. As a result, since the position of the first support member on the side of the uninterruptible power supply module can be changed even in a case where the width of the thyristor unit and the width of the control unit are different from each other, the arrangement positions of the thyristor unit and the control unit can be easily interchanged.

In the configuration in which the control module includes the first support member, the support member attachment portion, and a left-right position change portion, preferably, when the arrangement positions of the thyristor unit and the control unit in the housing of the control module are interchanged, the position of the support member attachment portion is changed to the first position or the second position and the thyristor unit is slidably moved in a direction along a direction in which a front surface side and a rear surface side of the housing face each other, on the first support member, so that arrangement position of the thyristor unit is interchangeable. With this configuration, the thyristor unit is slidably moved in the direction along the direction in which the front surface side and the rear surface side of the housing of the control module face each other, on the first support member, so that the thyristor unit can be easily housed in the housing of the control module or the thyristor unit can be easily taken out from the inside of the housing of the control module. As a result, the arrangement position of the thyristor unit can be easily interchanged in the housing of the control module.

In this case, preferably, the control module further includes a first restriction member that is provided on the front surface side of the housing of the control module with respect to the thyristor unit, and that restricts movement of the thyristor unit to the front surface side of the housing of the control module after the arrangement positions of the thyristor unit and the control unit in the housing of the control module are interchanged. With this configuration, it is possible to prevent the thyristor unit housed in the housing of the control module from moving to the front surface side of the housing of the control module after the arrangement positions of the thyristor unit and the control unit in the housing of the control module are interchanged (after the thyristor unit is housed in the housing of the control module).

In the configuration in which the control module includes the first support member, the support member attachment portion, and the left-right position change portion, preferably, the control module further includes a second support member that supports the control unit, a side of the second support member on a side of the input module in a left-right direction is attached to the support member attachment portion via the first support member, and when the arrangement positions of the thyristor unit and the control unit in the housing of the control module are interchanged, the position of the support member attachment portion is changed to the first position or the second position and the control unit is slidably moved in a direction along a direction in which a front surface side and a rear surface side of the housing face each other, on the second support member, so that arrangement position of the control unit is interchangeable. With this configuration, the position of the support member attachment portion is changed to the first position or the second position by the left-right position change portion, so that it is possible to change the position of the second support member on the side of the input module where the second support member is attached to the support member attachment portion via the first support member. As a result, since the position of the second support member on the side of the input module where the second support member is attached to the support member attachment portion via the first support member can be changed even in a case where the width of the thyristor unit and the width of the control unit are different from each other, the arrangement positions of the thyristor unit and the control unit can be easily interchanged. Further, the control unit is slidably moved in the direction along the direction in which the front surface side and the rear surface side of the housing of the control module face each other, on the second support member, so that the control unit can be easily housed in the housing of the control module or the control unit can be easily taken out from the housing of the control module. As a result, the arrangement position of the control unit can be easily interchanged in the housing of the control module.

In this case, preferably, the control module further includes a second restriction member that is provided on the front surface side of the housing of the control module with respect to the control unit, and that restricts movement of the control unit to the front surface side of the housing of the control module after the arrangement positions of the thyristor unit and the control unit in the housing of the control module are interchanged. With this configuration, it is possible to prevent the control unit housed in the housing of the control module from moving to the front surface side of the housing of the control module after the arrangement positions of the thyristor unit and the control unit in the housing of the control module are interchanged (after the control unit is housed in the housing of the control module).

In order to achieve the above object, according to a second aspect of the present invention, there is provided a control device for an uninterruptible power supply apparatus, including: a thyristor unit that has a plurality of thyristors which is provided so as to correspond to respective phases of power received from an AC power supply for bypass power supply provided outside the apparatus; a control unit that controls power conversion of an uninterruptible power supply module including a power conversion unit which converts power received from an AC power supply provided outside the apparatus; and a housing that houses the thyristor unit and the control unit, in which the control device is disposed in a left-right direction of an input module that inputs the power received from the AC power supply for bypass power supply provided outside the apparatus to the plurality of thyristors, and at least arrangement positions of the thyristor unit and the control unit are interchangeable in a left-right direction, in the housing.

The control device for an uninterruptible power supply apparatus according to the second aspect is disposed in the left-right direction of the input module that inputs the power received from the AC power supply for bypass power supply provided outside the apparatus to the plurality of thyristors, as described above. The control device for an uninterruptible power supply apparatus according to the second aspect is configured such that at least arrangement positions of the thyristor unit and the control unit are interchangeable in the left-right direction, in the housing. With this, since the arrangement positions of the thyristor unit and the control unit can be interchanged in the left-right direction, the thyristor unit can be disposed on the side close to the input module. Therefore, the thyristor unit having the plurality of thyristors can be disposed on the side on which the input module that inputs the power received from the AC power supply for bypass power supply provided outside the apparatus to the plurality of thyristors is disposed regardless of whether the uninterruptible power supply module is disposed on a left or right side of the control device for an uninterruptible power supply apparatus. As a result, it is possible to make the wiring lines more compact by restraining the lengths of the wiring lines that connect the thyristors and the wiring lines provided inside the input module and electrically connected to the AC power supply for bypass power supply from increasing, regardless of whether the input module is disposed on the left or right side of the control device for an uninterruptible power supply apparatus in which the thyristors are housed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments embodying the present invention will be described with reference to the drawings.
(Overall Configuration of Uninterruptible Power Supply Apparatus)

The overall configuration of an uninterruptible power supply apparatus (UPS: uninterruptible power supply or PCS: power conditioning system) 100 according to one embodiment of the present invention will be described with reference to FIGS. 1 to 4.

Figure 1:
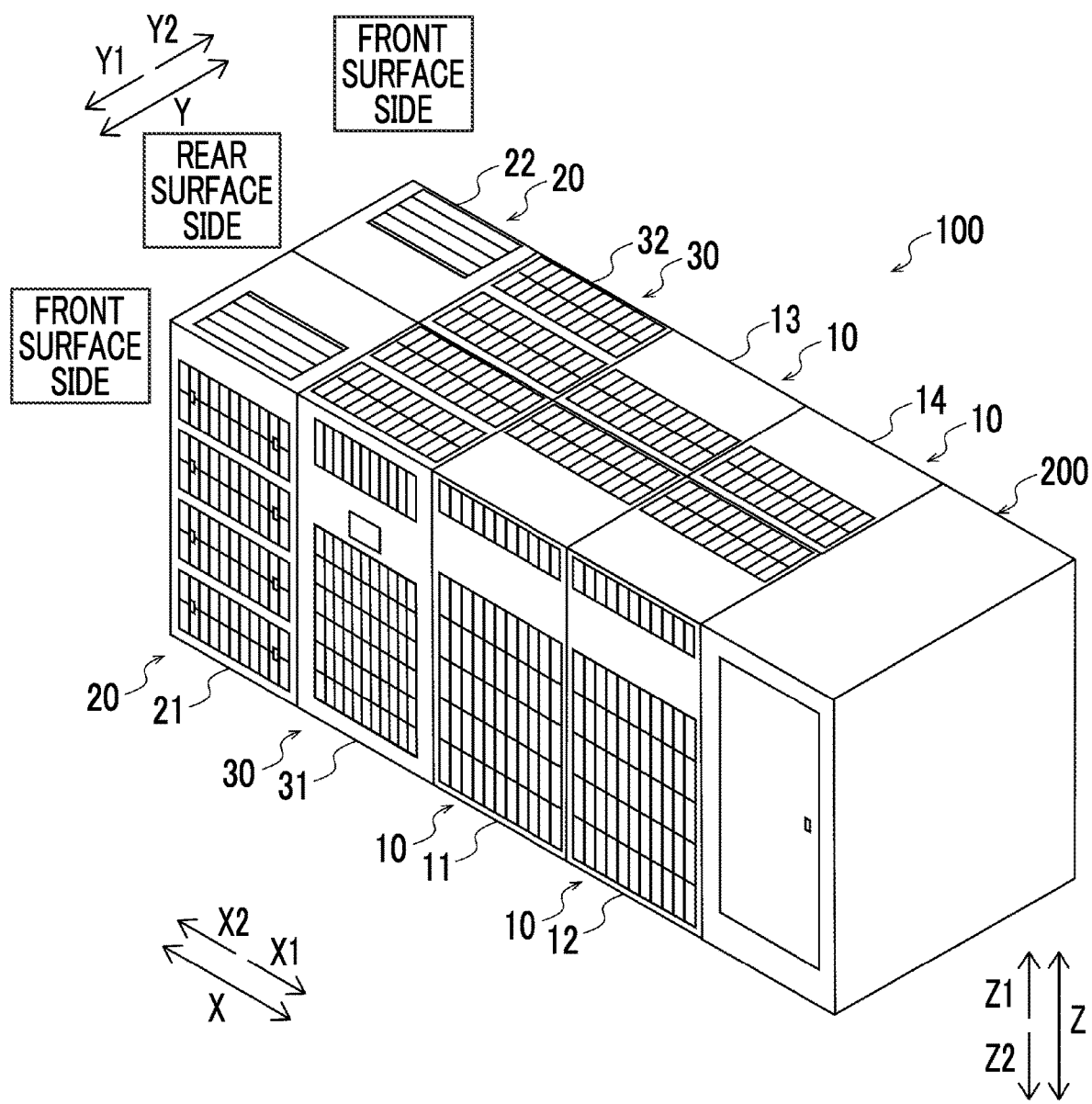
FIG. 1 is a perspective view showing an uninterruptible power supply apparatus according to one embodiment of the present invention.

As shown in FIG. 1, the uninterruptible power supply apparatus 100 includes an uninterruptible power supply module 10, an input module 20, and a control module 30.

In the present embodiment, the uninterruptible power supply apparatus 100 includes a plurality of uninterruptible power supply modules 10 (uninterruptible power supply modules 11, 12, 13, and 14) as shown in FIG. 1. In addition, the uninterruptible power supply apparatus 100 includes two input modules 20 (input modules 21 and 22) and two control modules 30 (control modules 31 and 32). The control module 30 (control modules 31 and 32) is an example of the "control device for an uninterruptible power supply apparatus" in the claims.

The control module 30 is disposed in the left-right direction (X direction) of the input module 20.

Specifically, the control module 31 is disposed on the right side (X1 direction side) of the input module 21 when viewed from a Y1 direction side, and the control module 32 is disposed on the left side (X1 direction side) of the input module 22 when viewed from a Y2 direction side.

Further, the control module 30 is disposed between the uninterruptible power supply module 10 and the input module 20. Specifically, the control module 31 is disposed between the uninterruptible power supply module 11 (uninterruptible power supply module 12) and the input module 21 in the X direction. Further, the control module 32 is disposed between the uninterruptible power supply module 13 (uninterruptible power supply module 14) and the input module 22 in the X direction.

In a first embodiment, the input module 21, the control module 31, the uninterruptible power supply module 11, and the uninterruptible power supply module 12 are disposed in this order from an X2 direction side. Further, the input module 22, the control module 32, the uninterruptible power supply module 13, and the uninterruptible power supply module 14 are disposed in this order from the X2 direction side.

In the uninterruptible power supply apparatus 100, the rear surface side of the uninterruptible power supply module 11 and the rear surface side of the uninterruptible power supply module 13 are disposed so as to face each other in a Y direction. The rear surface side is a side opposite to a direction (front surface side) in which an operator can access a device provided inside the module. Further, in the uninterruptible power supply apparatus 100, the rear surface side of the uninterruptible power supply module 12 and the rear surface side of the uninterruptible power supply module 14 are disposed so as to face each other in the Y direction. Further, in the uninterruptible power supply apparatus 100, the rear surface side of the input module 21 and the rear surface side of the input module 22 are disposed so as to face each other in the Y direction, and the rear surface side of the control module 31 and the rear surface side of the control module 32 are disposed so as to face each other in the Y direction. Further, an output branch board 200 is provided on the X1 direction side of the uninterruptible power supply apparatus 100.

Figure 2:
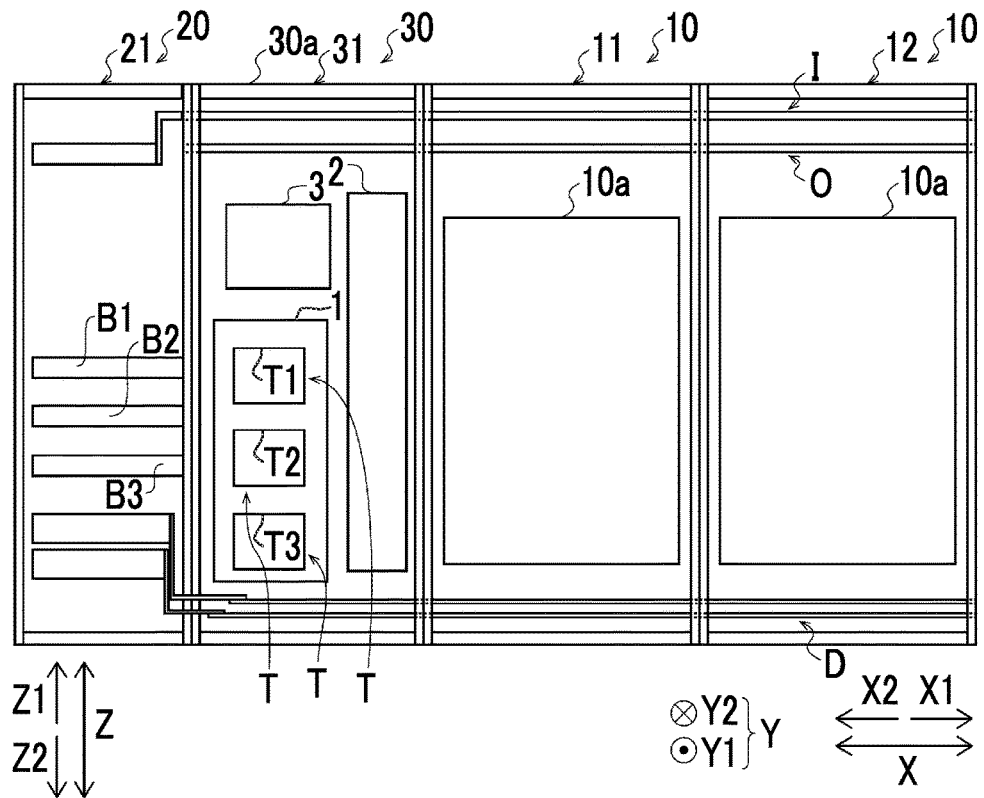
FIG. 2 is a view showing disposition of a thyristor unit and a control unit as viewed from a Y1 direction side of the uninterruptible power supply apparatus.

As shown in FIG. 2, the control module 31 includes a thyristor unit 1, a control unit 2, and a circuit breaker 3. In addition, the control module 31 includes a housing 30a that houses the thyristor unit 1, the control unit 2, and the circuit breaker 3.

Further, as shown in FIG. 2, in the control module 31, the thyristor unit 1 is disposed on the side of the input module 21. In the control module 31, the control unit 2 is disposed on the side of the uninterruptible power supply module 11 (uninterruptible power supply module 12). That is, the thyristor unit 1 of the control module 31 is disposed on the left side (X2 direction side) when viewed from the Y1 direction side. The control unit 2 of the control module 31 is disposed on the right side (X1 direction side) when viewed from the Y1 direction side.

Figure 3:
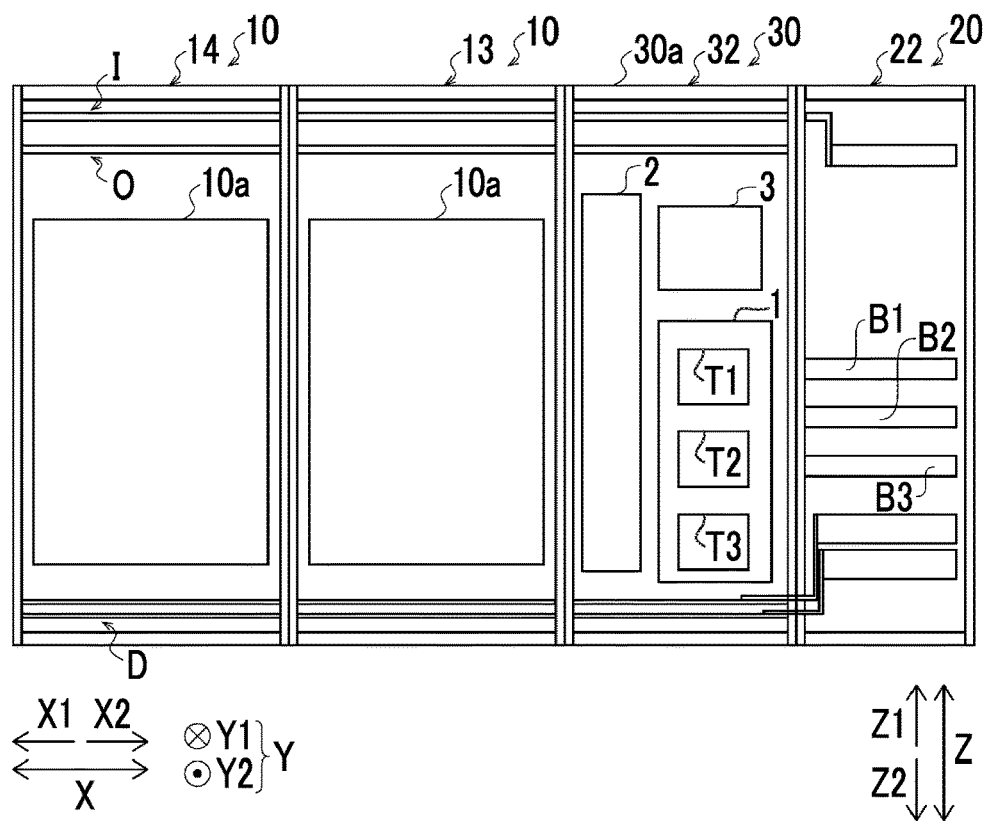
FIG. 3 is a view showing disposition of the thyristor unit and the control unit as viewed from a Y2 direction side of the uninterruptible power supply apparatus.

Further, as shown in FIG. 3, the control module 32 includes the thyristor unit 1, the control unit 2, and the circuit breaker 3. Further, the control module 32 includes the housing 30a that houses the thyristor unit 1, the control unit 2, and the circuit breaker 3.

Further, as shown in FIG. 3, in the control module 32, the thyristor unit 1 is disposed on the side of the input module 22. In the control module 32, the control unit 2 is disposed on the side of the uninterruptible power supply module 13 (uninterruptible power supply module 14). That is, the thyristor unit 1 of the control module 32 is disposed on the right side (X2 direction side) when viewed from the Y2 direction side. The control unit 2 of the control module 32 is disposed on the left side (X1 direction side) when viewed from the Y2 direction side.

The control unit 2 is configured to control the power conversion of the uninterruptible power supply module 10. In the present embodiment, the control unit 2 (see FIG. 2) of the control module 31 is configured to control the power conversion of the uninterruptible power supply modules 11 and 12. Further, the control unit 2 (see FIG. 3) of the control module 32 is configured to control the power conversion of the uninterruptible power supply modules 13 and 14.

Further, as shown in FIGS. 2 and 3, the thyristor unit 1 has a plurality of thyristors T (thyristors T1, T2, and T3) that is provided so as to correspond to respective phases (U phase, V phase, and W phase) of power received from an AC power supply for bypass power supply 104 (see FIG. 4) provided outside the apparatus (outside the uninterruptible power supply apparatus 100).

Figure 4:
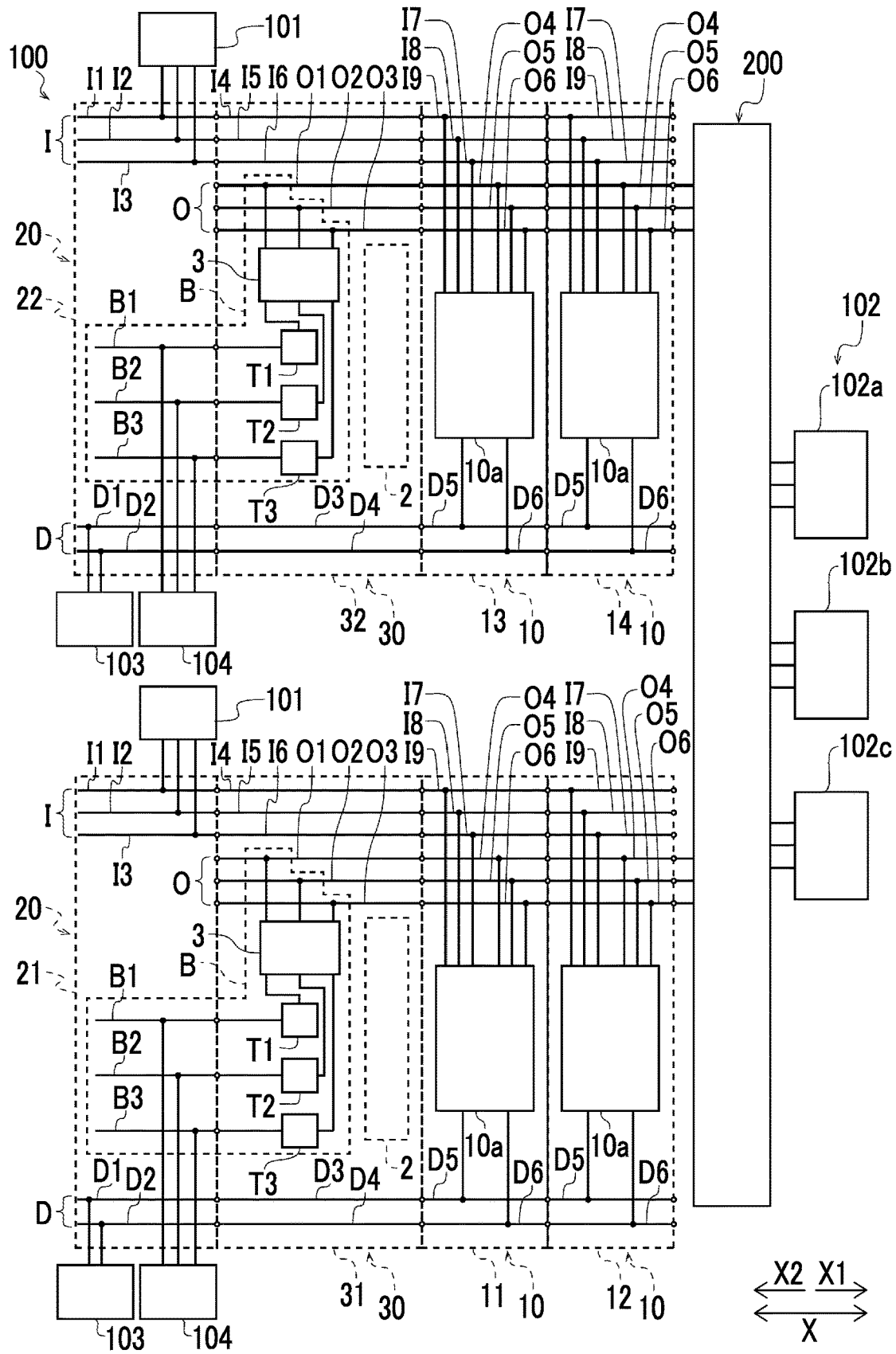
FIG. 4 is a schematic diagram illustrating a configuration of the uninterruptible power supply apparatus.

As shown in FIGS. 2 to 4, each of the plurality of uninterruptible power supply modules 10 (uninterruptible power supply modules 11 to 14) includes a power conversion unit 10a that converts power received from an AC power supply 101 (see FIG. 4) provided outside the apparatus.

The power conversion unit 10a is configured to convert the power received from the AC power supply 101 (see FIG. 4) provided outside the apparatus and to output the converted power to a load 102 (see FIG. 4) provided outside the apparatus.

The power conversion unit 10a includes a rectifier circuit, an inverter circuit, and a chopper circuit. The rectifier circuit has a function of converting AC power input to the power conversion unit 10a into DC power. The chopper circuit is configured as, for example, a three-level chopper circuit. The chopper circuit has a function of transforming and outputting a voltage input from a battery 103 (see FIG. 4) provided outside the apparatus. The DC power input from the battery 103 is input to the chopper circuit via a conductor, a capacitor, and a DC reactor (all not shown). Further, the inverter circuit has a function of converting DC power input from the rectifier circuit and the chopper circuit into AC power.

The input module 20 (input modules 21 and 22) is configured to input the power received from the AC power supply 101 provided outside the apparatus to the power conversion unit 10a. The power (AC power) received from the AC power supply 101 provided outside the apparatus is input to the power conversion unit 10a via an AC input bus I (buses I1 to I3) provided in the input module 20, an AC input bus I (buses I4 to I6) provided in the control module 30, and an AC input bus I (buses I7 to I9) provided in the uninterruptible power supply module 10.

Further, the input module 20 (input modules 21 and 22) is configured to input the power received from the battery 103 provided outside the apparatus to the power conversion unit 10a. The power (DC power) received from the battery 103 provided outside the apparatus is input to the power conversion unit 10a via a DC input bus D (buses D1 and D2) provided in the input module 20, a DC input bus D (buses D3 and D4) provided in the control module 30, and a DC input bus D (buses D5 and D6) provided in the uninterruptible power supply module 10.

In the first embodiment, as shown in FIG. 4, the input module 21 is configured to be electrically connected to the power conversion unit 10a of each of the uninterruptible power supply modules 11 and 12. Further, as shown in FIG. 4, the input module 22 is configured to be electrically connected to the power conversion unit 10a of each of the uninterruptible power supply modules 13 and 14.

The uninterruptible power supply apparatus 100 is configured to output power (AC power or DC power) converted by the power conversion unit 10a to the output branch board 200 via an AC output bus O (buses O4 to O6) provided in the uninterruptible power supply module 10.

Further, the input module 20 (input modules 21 and 22) is configured to input the power received from the AC power supply for bypass power supply 104 provided outside the apparatus to the plurality of thyristors T (thyristors T1 to T3) that is provided so as to correspond to respective phases of the power received from the AC power supply for bypass power supply 104 (see FIG. 4) provided outside the apparatus. The AC power supply 101 and the AC power supply for bypass power supply 104 may be the same power supply.

As shown in FIG. 4, in the uninterruptible power supply apparatus 100, a bypass current path B (bypass circuit) is formed from the input module 20 (input modules 21 and 22) to the control module 30 (control modules 31 and 32).

The bypass current path B electrically connects the AC power supply for bypass power supply 104 provided outside the apparatus and the AC output bus O (buses O1 to O3) of the control module 30 (control modules 31 and 32). The bypass current path B is a current path for outputting power received from the AC power supply for bypass power supply 104 provided outside the apparatus to the load 102 provided outside the apparatus, via the AC output bus O (buses O1 to O6). The bypass current path B is a current path used for maintenance of the uninterruptible power supply module 10 (uninterruptible power supply modules 11 to 14) and the like.

As shown in FIG. 4, the bypass current path B includes bypass wiring lines B1, B2, and B3 that are provided so as to correspond to the phases of the AC power received from the AC power supply for bypass power supply 104 provided outside the apparatus. The bypass wiring lines B1, B2, and B3 are provided in the input module 20 and are electrically connected to the thyristors T1, T2, and T3 of the control module 30 (thyristor unit 1), respectively.

The bypass wiring line B1 is electrically connected to the AC output bus O (bus O1) of the control module 30, via the thyristor T1 and the circuit breaker 3 of the control module 30. Further, the bypass wiring line B2 is electrically connected to the AC output bus O (bus O2) of the control module 30, via the thyristor T2 and the circuit breaker 3 of the control module 30. Further, the bypass wiring line B3 is electrically connected to the AC output bus O (bus O3) of the control module 30, via the thyristor T3 and the circuit breaker 3 of the control module 30.

As shown in FIG. 4, the circuit breaker 3 is provided in the current path between the plurality of thyristors T (thyristors T1, T2, and T3) and the power conversion unit 10a, and is configured to interrupt power output from the power conversion unit 10a.

Specifically, the circuit breaker 3 is provided between the AC output bus O (buses O1 to O3) and the thyristor T (thyristors T1 to T3) in the bypass current path B of the control module 30. The circuit breaker 3 is configured to switch between a state in which the bus O side and the thyristor T side of the circuit breaker 3 are electrically connected to each other and a state in which the bus O side and the thyristor T side of the circuit breaker 3 are electrically disconnected to each other.

With the above-described configuration, the uninterruptible power supply apparatus 100 is configured to output the power received from the AC power supply for bypass power supply 104 provided outside the apparatus to the output branch board 200, via the bypass current path B and the AC output bus O.

Further, the output branch board 200 is configured such that the power converted by the power conversion unit 10a of each of the plurality of uninterruptible power supply modules 10 (uninterruptible power supply modules 11 to 14) is input thereto, and is configured to cause the power to branch off to the load 102 provided outside the apparatus. For example, loads 102a, 102b, and 102c are connected to the output branch board 200, as the load 102, and the output branch board 200 is configured to cause the input power to branch off according to the connected loads 102a, 102b, and 102c. Only one load 102 may be provided for the uninterruptible power supply apparatus 100.

The AC power supply 101, the battery 103, and the AC power supply for bypass power supply 104 that are provided outside the apparatus are connected to each of the input modules 21 and 22 of the uninterruptible power supply apparatus 100, but AC power supplies, batteries, and AC power supplies for bypass power supply connected to the input modules 21 and 22 may be different from each other.

(Configuration of Control Module)

Figure 5:
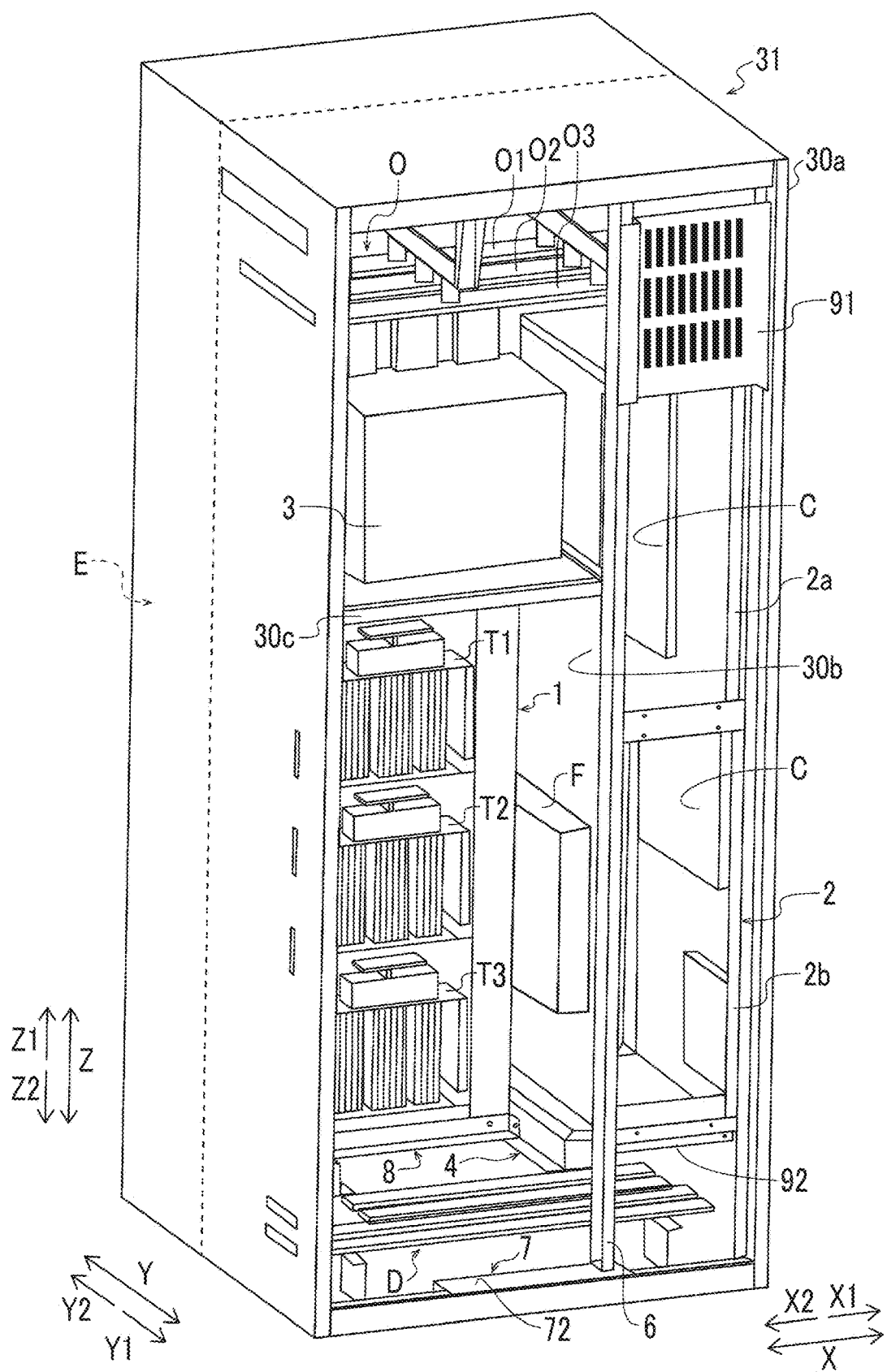
FIG. 5 is a perspective view showing a configuration inside a housing of a control module on the Y1 direction side according to one embodiment of the present invention.

Further, as shown in FIG. 5, an exhaust duct E is provided on the rear surface side inside the housing 30a of the control module 31 (control module 30). The thyristor unit 1, the control unit 2, and the circuit breaker 3 are disposed on the front surface side of the housing 30a (the front surface side of the exhaust duct E).

As shown in FIG. 5, in the thyristor unit 1, the plurality of thyristors T (thyristors T1 to T3) is arranged in an up-down direction, and the thyristor T1, the thyristor T2, and the thyristor T3 are disposed from above (Z1 direction side) in this order.

Further, as shown in FIG. 5, the control unit 2 includes a plurality of control boards C aligned in the up-down direction. The control board C includes a circuit board on which a central processing unit (CPU), a read only memory (ROM), a random access memory (RAM), or the like is mounted. Further, the control board C is disposed so as to follow the up-down direction (Z direction).

Further, a partition plate 30b (see FIG. 5) is provided between the thyristor unit 1 and the control unit 2. The partition plate 30b is a member having a plate shape that partitions a space in which the thyristor unit 1 is housed and a space in which the control unit 2 is housed, in the left-right direction (X direction).

Figure 6:
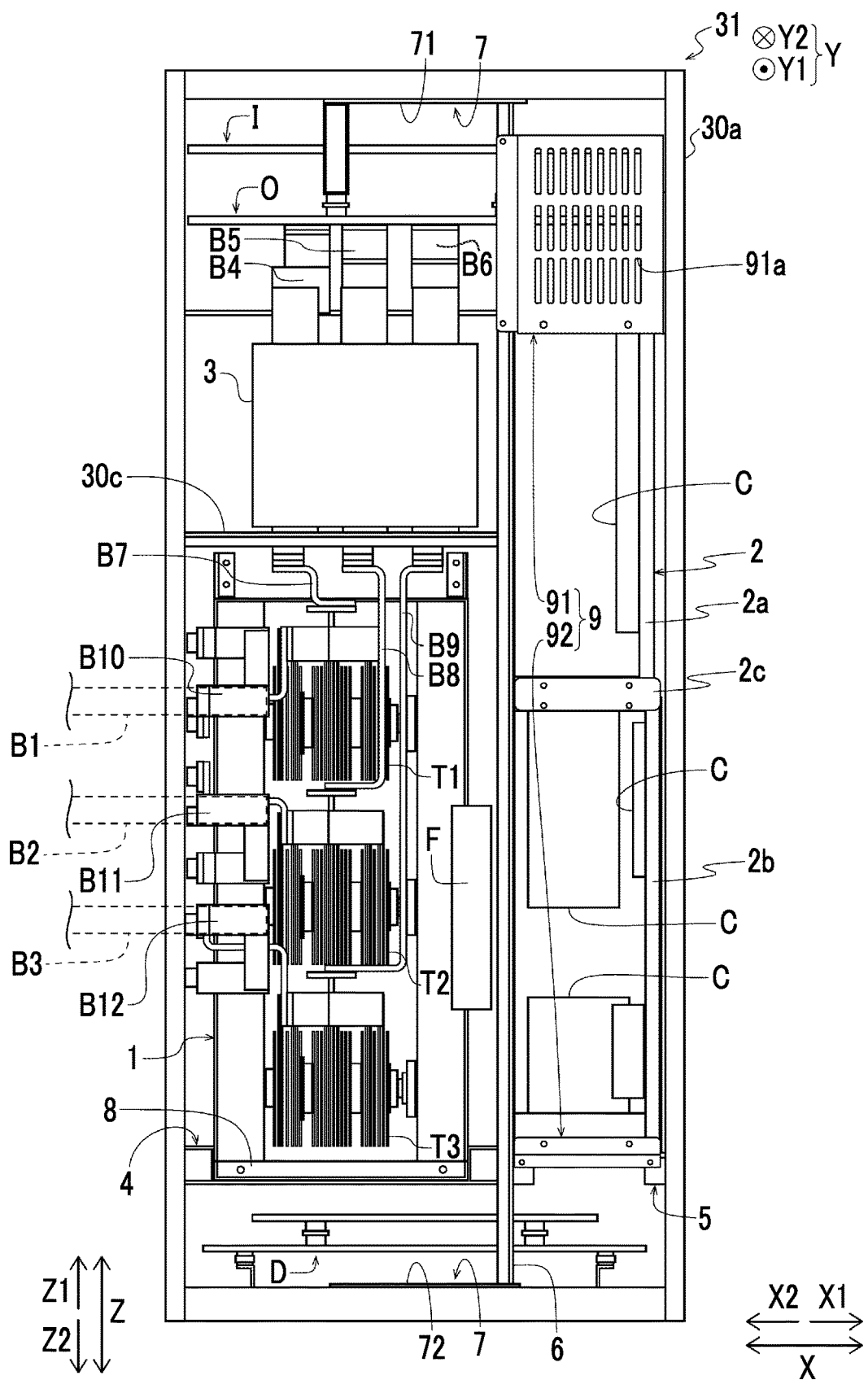
FIG. 6 is a front view showing the configuration inside the housing of the control module on the Y1 direction side.

Further, as shown in FIGS. 5 and 6, the circuit breaker 3 is placed on the upper surface of a partition plate 30c disposed on the upper part of the thyristor unit 1, and is fastened and fixed to the upper surface of the partition plate 30c. The partition plate 30c is a member having a plate shape that partitions the space in which the thyristor unit 1 is housed and a space in which the circuit breaker 3 is housed, in the up-down direction (Z direction). The circuit breaker 3 is electrically connected to each of the AC output buses O1, O2, and O3 (see FIG. 5) via conductor wiring lines B4, B5, and B6 (see FIG. 6). Then, as shown in FIG. 6, the circuit breaker 3 is electrically connected to each of the thyristors T1, T2, and T3 via conductor wiring lines B7, B8, and B9.

Further, as shown in FIG. 6, the plurality of thyristors T (thyristors T1 to T3) of the thyristor unit 1 is electrically connected to the bypass wiring lines B1, B2, and B3 of the input module 20 via conductor wiring lines B10, B11, and B12, respectively. The conductor wiring lines B4 to B12 include, for example, copper bars. FIG. 5 shows the control module 31 in a state before the conductor wiring lines B4 to B12 are attached thereto.

Further, in the control module 31 (control module 30), as shown in FIG. 6, the AC input bus I, the AC output bus O, the circuit breaker 3, the thyristor unit 1, and the DC input bus D are provided in the housing 30a in this order from above (Z1 direction side).

Further, as shown in FIG. 6, the control module 30 (control module 31) includes a first support member 4 that supports the thyristor unit 1. In addition, as shown in FIG. 6, the control module 30 (control module 31) includes a second support member 5 that supports the control unit 2.

Further, as shown in FIG. 6, the control module 31 (control module 30) includes a support member attachment portion 6 and a left-right position change portion 7. Further, the left-right position change portion 7 includes a left-right position change portion 71 provided on the upper side (Z1 direction side) of the housing 30a and a left-right position change portion 72 provided on the lower side (Z2 direction side) of the housing 30a.

Further, as shown in FIG. 6, the first support member 4 is provided below the thyristor unit 1 (Z2 direction side), and the second support member 5 is provided below the control unit 2 (Z2 direction side). Further, the first support member 4 and the second support member 5 are disposed so as to sandwich the support member attachment portion 6 therebetween, in the left-right direction (X direction), as shown in FIG. 6.

Further, the control module 31 (control module 30) includes a first restriction member 8 and a second restriction member 9, as shown in FIG. 6.

The first restriction member 8 is provided on the front surface side of the housing 30a of the control module 31 (control module 30) with respect to the thyristor unit 1. As shown in FIG. 6, the first restriction member 8 is disposed so as to overlap the thyristor unit 1 and the first support member 4 when viewed from the Y direction (Y1 direction side or Y2 direction side).

The second restriction member 9 is provided on the front surface side of the housing 30a of the control module 31 (control module 30) with respect to the control unit 2. Further, the second restriction member 9 includes a restriction member 91 that is fastened and fixed to the upper side of the control unit 2 and a restriction member 92 that is fastened and fixed to the lower side of the control unit 2, as shown in FIG. 6.

The restriction member 91 is a member having a plate shape in which a slit 91a is formed. As shown in FIG. 6, the restriction member 91 is disposed so as to overlap the control unit 2, the AC input bus I, and the AC output bus O when viewed from the Y direction (Y1 direction side or Y2 direction side).

The restriction member 92 is a member having a plate shape, and is disposed so as to overlap the control unit 2 and the second support member 5 when viewed from the Y direction (Y1 direction side or Y2 direction side), as shown in FIG. 6.

(Configuration of Thyristor Unit and Control Unit)

Figure 7:
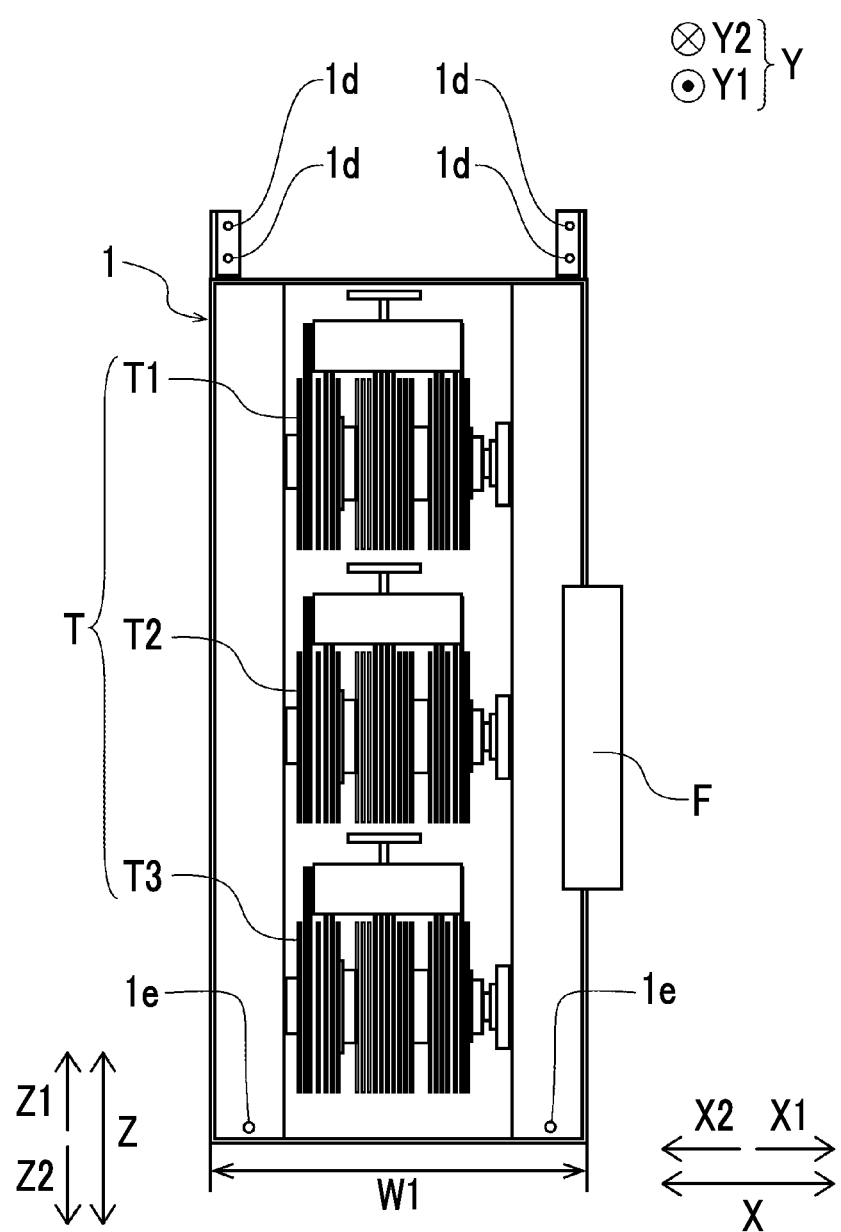
FIG. 7 is a view showing a configuration of the thyristor unit according to one embodiment of the present invention.

As shown in FIG. 7, a fastening hole portion 1d for fastening and fixing the thyristor unit 1 to the housing 30a of the control module 30 is provided on the upper side (Z1 direction side) of the thyristor unit 1. Further, a fastening hole portion 1e for fastening and fixing the first restriction member 8 to the thyristor unit 1 is provided on the lower side (Z2 direction side) of the thyristor unit 1, as shown in FIG. 7.

Further, as shown in FIG. 7, a drive control unit F including a drive control board for controlling the drive of each of the plurality of thyristors T (thyristors T1 to T3) is attached to the thyristor unit 1. The drive control unit F is attached to the thyristor unit 1 in the left-right direction. The drive control unit F is configured such that the attachment position is changeable between one side and the other side in the left-right direction according to the arrangement position of the thyristor unit 1 in the housing 30a. In the control module 31, the drive control unit F is attached to a side (the X1 direction side on which the control unit 2 is provided) opposite to a side on which the input module 21 of the thyristor unit 1 is disposed.

Figure 8:
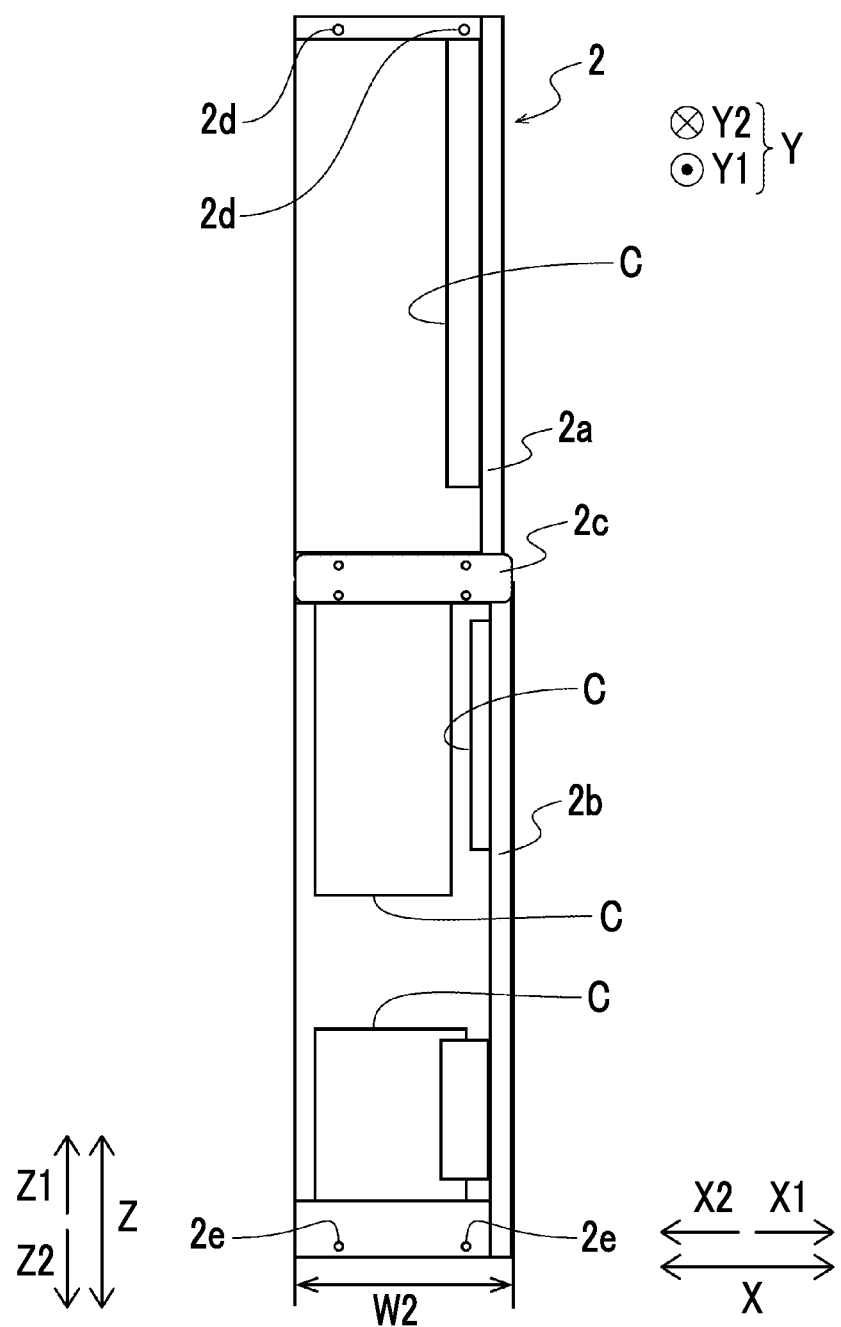
FIG. 8 is a view showing a configuration of the control unit according to one embodiment of the present invention.

The control unit 2 is composed of an upper unit 2a and a lower unit 2b, as shown in FIG. 8. The control board C is provided on each of the upper unit 2a and the lower unit 2b. The control unit 2 is configured to be separable into the upper unit 2a and the lower unit 2b. A fixing member 2c is fastened and fixed to the front surface side of each of the upper unit 2a and the lower unit 2b, whereby the upper unit 2a and the lower unit 2b are fixed to each other. Further, the upper unit 2a and the lower unit 2b are units having a box shape in which the front surface side and the other side (left side) in the left-right direction are open (see FIG. 5).

The control board C provided in the lower unit 2b includes at least a control board for controlling the uninterruptible power supply module 10. Further, the control board C provided in the upper unit 2a includes a control board for performing control corresponding to the connection destination, such as the AC power supply 101, the load 102, the battery 103, the AC power supply for bypass power supply 104, and the output branch board 200, which are connected to the uninterruptible power supply apparatus 100.

As shown in FIG. 8, a fastening hole portion 2d for fastening and fixing the second restriction member 9 (restriction member 91) is provided on the upper side (Z1 direction side) of the control unit 2 (upper unit 2a). Further, as shown in FIG. 8, a fastening hole portion 2e for fastening and fixing the second restriction member 9 (restriction member 92) is provided on the lower side (Z2 direction side) of the control unit 2 (lower unit 2b).

Further, the control unit 2 is configured to have a width W2 (see FIG. 8) in the left-right direction smaller than a width W1 (see FIG. 7) of the thyristor unit 1 in the left-right direction (X direction).

Figure 9:
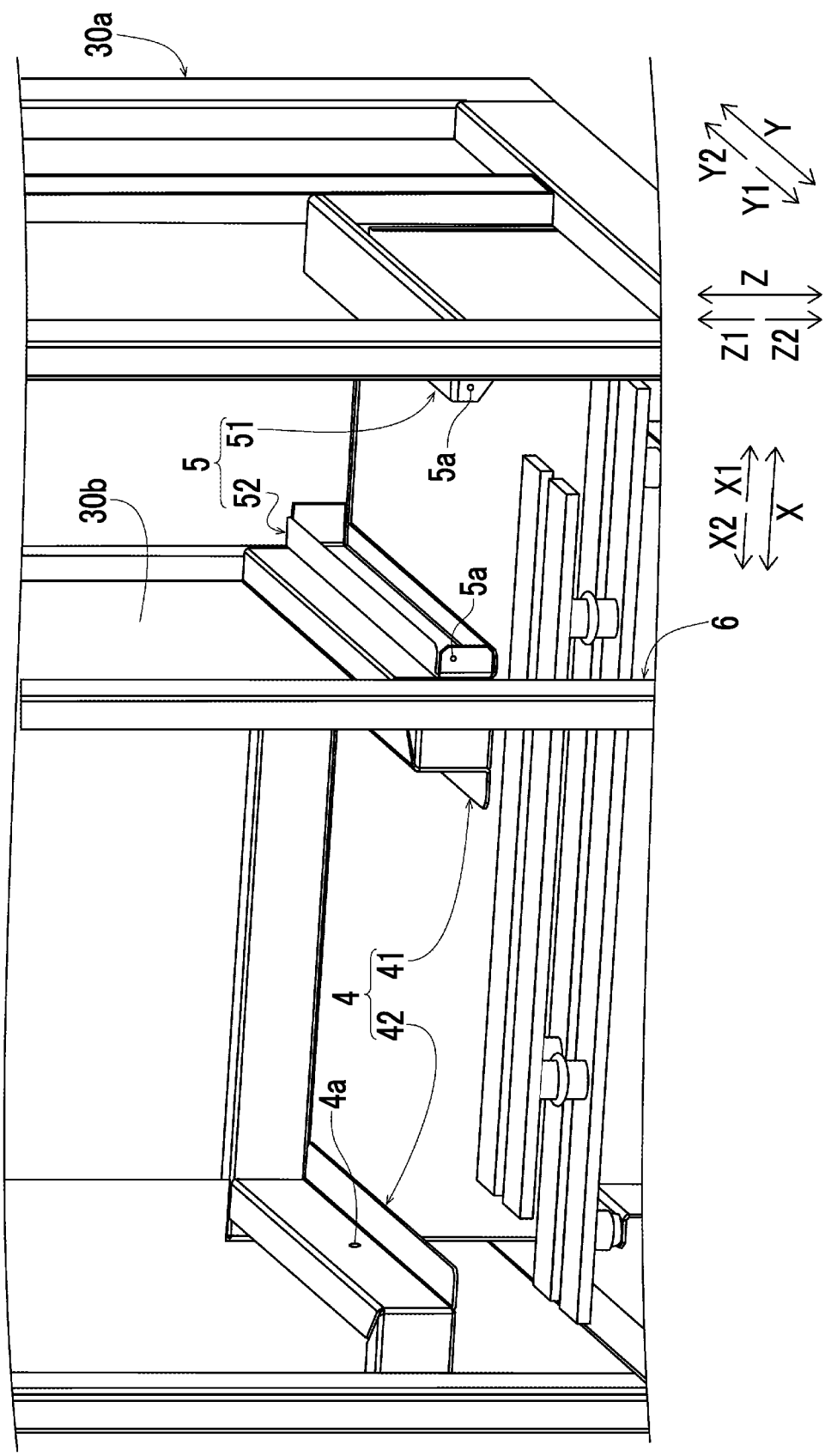
FIG. 9 is a perspective view showing a configuration of a first support member and a second support member according to one embodiment of the present invention.

As shown in FIG. 9, the first support member 4 includes a first portion 41 and a second portion 42. The first support member 4 (the first portion 41 and the second portion 42) is formed so as to extend along a direction (Y direction) in which the front surface side and the rear surface side of the housing 30a of the control module 30 face each other. Further, each of the first portion 41 and the second portion 42 is provided with a fastening hole portion 4a.

Further, as shown in FIG. 9, the second support member 5 includes a first portion 51 and a second portion 52. The second support member 5 (first portion 51 and second portion 52) is formed so as to extend along a direction (Y direction) in which the front surface side and the rear surface side of the housing 30a of the control module 30 face each other. Further, each of the first portion 51 and the second portion 52 is provided with a fastening hole portion 5a.

Figure 10:
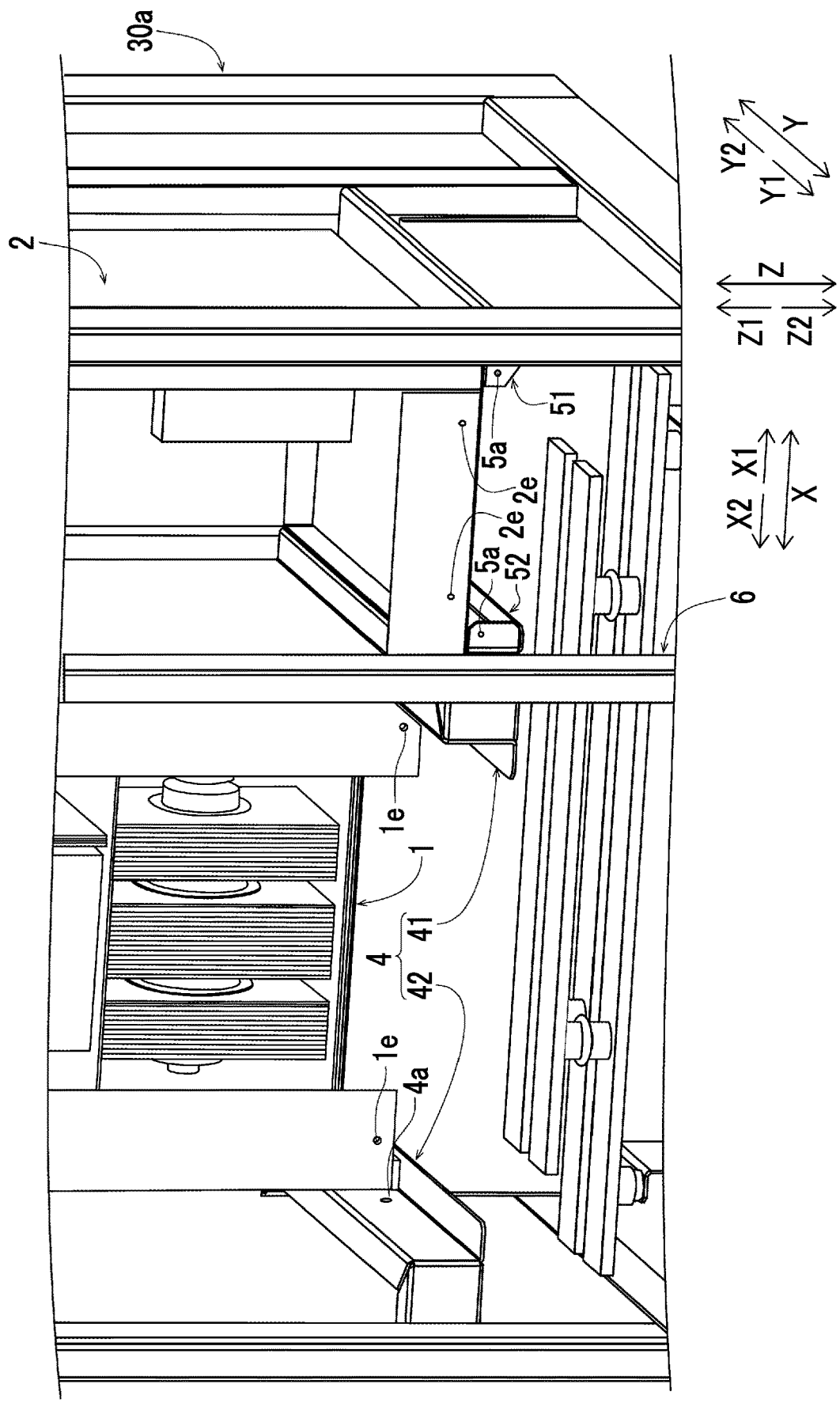
FIG. 10 is a perspective view showing a state in which the thyristor unit and the control unit according to one embodiment of the present invention are supported by the first support member and the second support member, respectively.

The first support member 4 (each of the first portion 41 and the second portion 42) supports the mounted thyristor unit 1 from below, as shown in FIG. 10. Further, the second support member 5 (each of the first portion 51 and the second portion 52) supports the mounted control unit 2 from below, as shown in FIG. 10.

Figure 11:
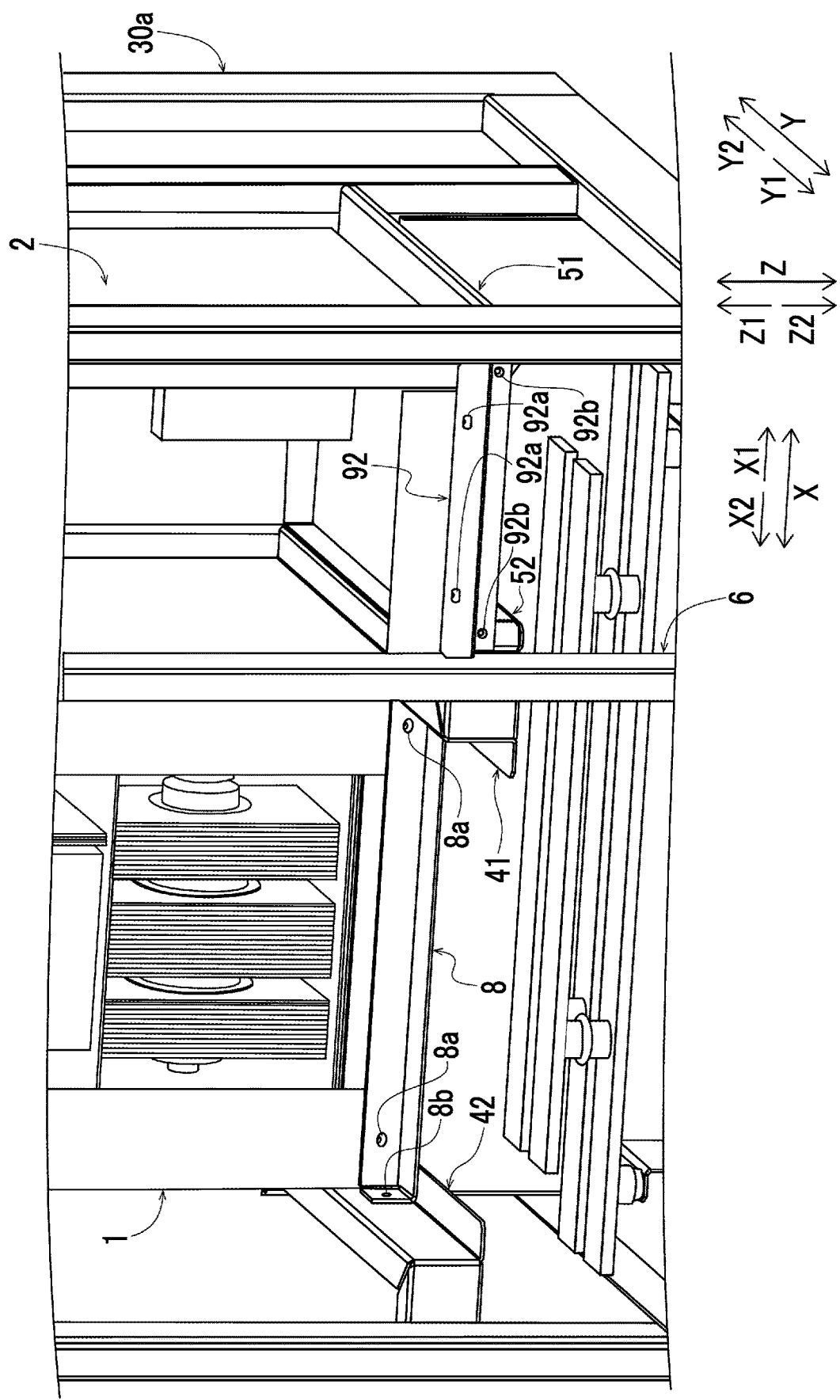
FIG. 11 is a perspective view showing a state in which a first restriction member and a second restriction member are attached to the thyristor unit and the control unit according to one embodiment of the present invention, respectively.

The first restriction member 8 is provided with fastening hole portions 8a and 8b, as shown in FIG. 11. The first restriction member 8 is fastened and fixed to the thyristor unit 1 by using the fastening hole portion 8a and the fastening hole portion 1e (see FIG. 10) provided in the thyristor unit 1. Further, the first restriction member 8 is fastened and fixed to the first support member 4 by using the fastening hole portion 8b and the fastening hole portion 4a (see FIGS. 10 and 13) provided in the first support member 4 (each of the first portion 41 and the second portion 42). With this, the first restriction member 8 is fastened and fixed to the thyristor unit 1 and the first support member 4, so that the movement of the thyristor unit 1 to the front surface side of the housing 30a of the control module 30 is restricted.

Further, as shown in FIG. 11, the restriction member 92 is provided with fastening hole portions 92a and 92b. The restriction member 92 is fastened and fixed to the control unit 2 by using the fastening hole portion 92a and the fastening hole portion 2e (see FIG. 10) provided in the control unit 2. Further, the restriction member 92 is fastened and fixed to the second support member 5 by using the fastening hole portion 92b and the fastening hole portion 5a (see FIG. 10) provided in the second support member 5 (each of the first portion 51 and the second portion 52). With this, the restriction member 92 is fastened and fixed to the control unit 2 and the second support member 5, so that the movement of the control unit 2 to the front surface side of the housing 30a of the control module 30 is restricted.

Figure 12:
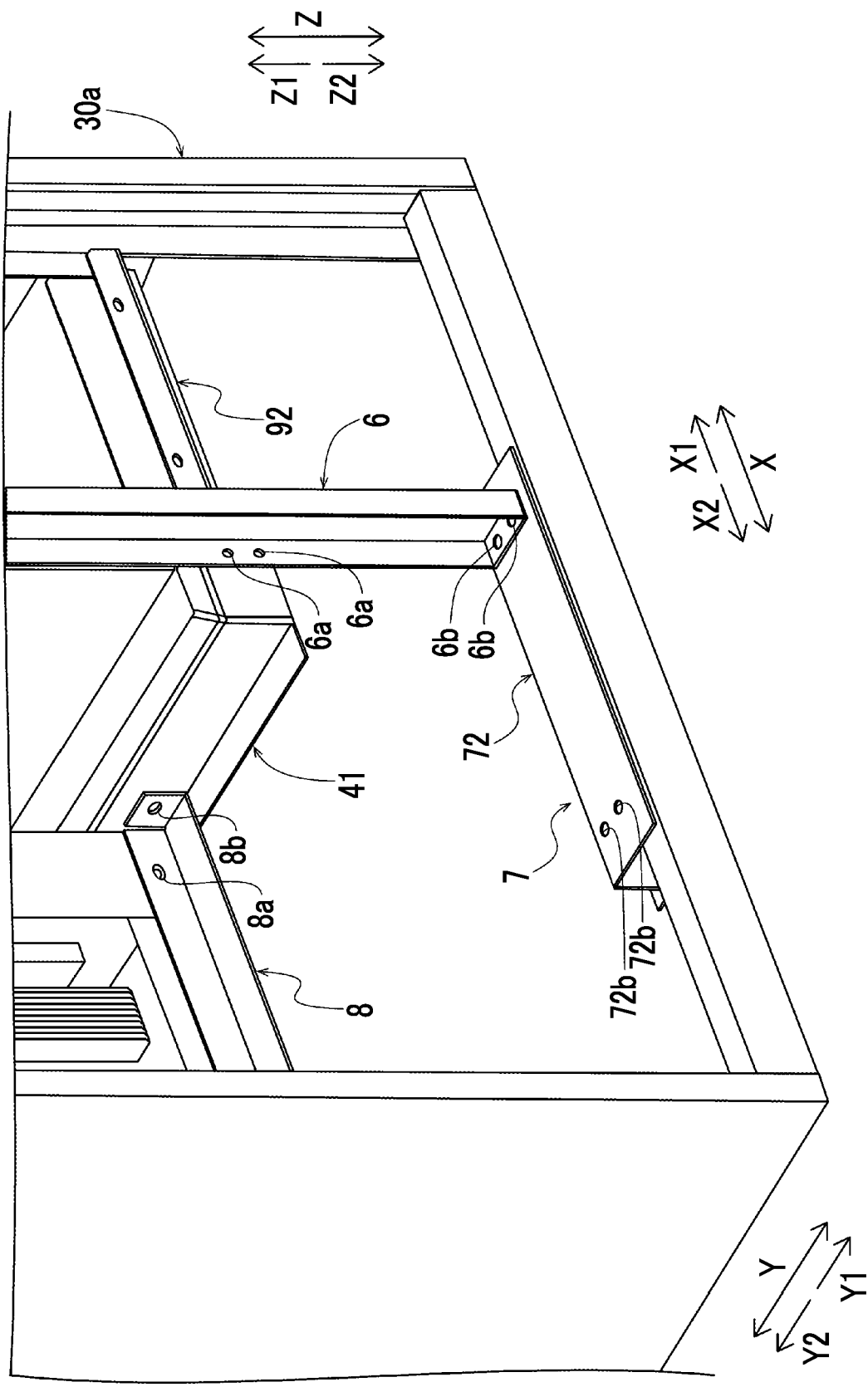
FIG. 12 is a first perspective view showing a configuration of a left-right position change portion provided on a lower portion of the housing of the control module according to one embodiment of the present invention.

Further, the support member attachment portion 6 is a member for attaching the side of the first support member 4 on the side of the uninterruptible power supply module 10. In the control module 31, as shown in FIG. 12, the first portion 41 of the first support member 4 is attached to the support member attachment portion 6.

A fastening hole portion 6a (see FIG. 12) is provided on the support member attachment portion 6 on the side (Y2 direction side) of the first support member 4. Further, as shown in FIG. 12, a fastening hole portion 6b is provided on the lower side of the support member attachment portion 6.

The first portion 41 of the first support member 4 is fastened and fixed to the support member attachment portion 6 by using the fastening hole portion 6a (see FIG. 12) and a fastening hole portion 4b (see FIG. 13) provided in the first support member 4 on the side (Y1 direction side) of the support member attachment portion 6.

Further, the left-right position change portion 72 is provided with a fastening hole portion 72a (see FIG. 13) at a first position on one side (right side) in the left-right direction (X direction), and is provided with a fastening hole portion 72b (see FIG. 13) at a second position on the other side (left side) in the left-right direction (X direction). Then, in the control module 31, the support member attachment portion 6 is fastened and fixed to the left-right position change portion 72 (left-right position change portion 7) by using the fastening hole portion 6b (see FIG. 12) and the fastening hole portion 72a (see FIG. 13) provided at the first position on one side (right side) in the left-right direction (X direction).

Further, the side of the second support member 5 on the side of the input module 20 in the left-right direction (X direction) is attached to the support member attachment portion 6 via the first support member 4. In the control module 31, the second portion 52 of the second support member 5 is attached to the support member attachment portion 6 via the first portion 41 of the first support member 4.

Figure 13:
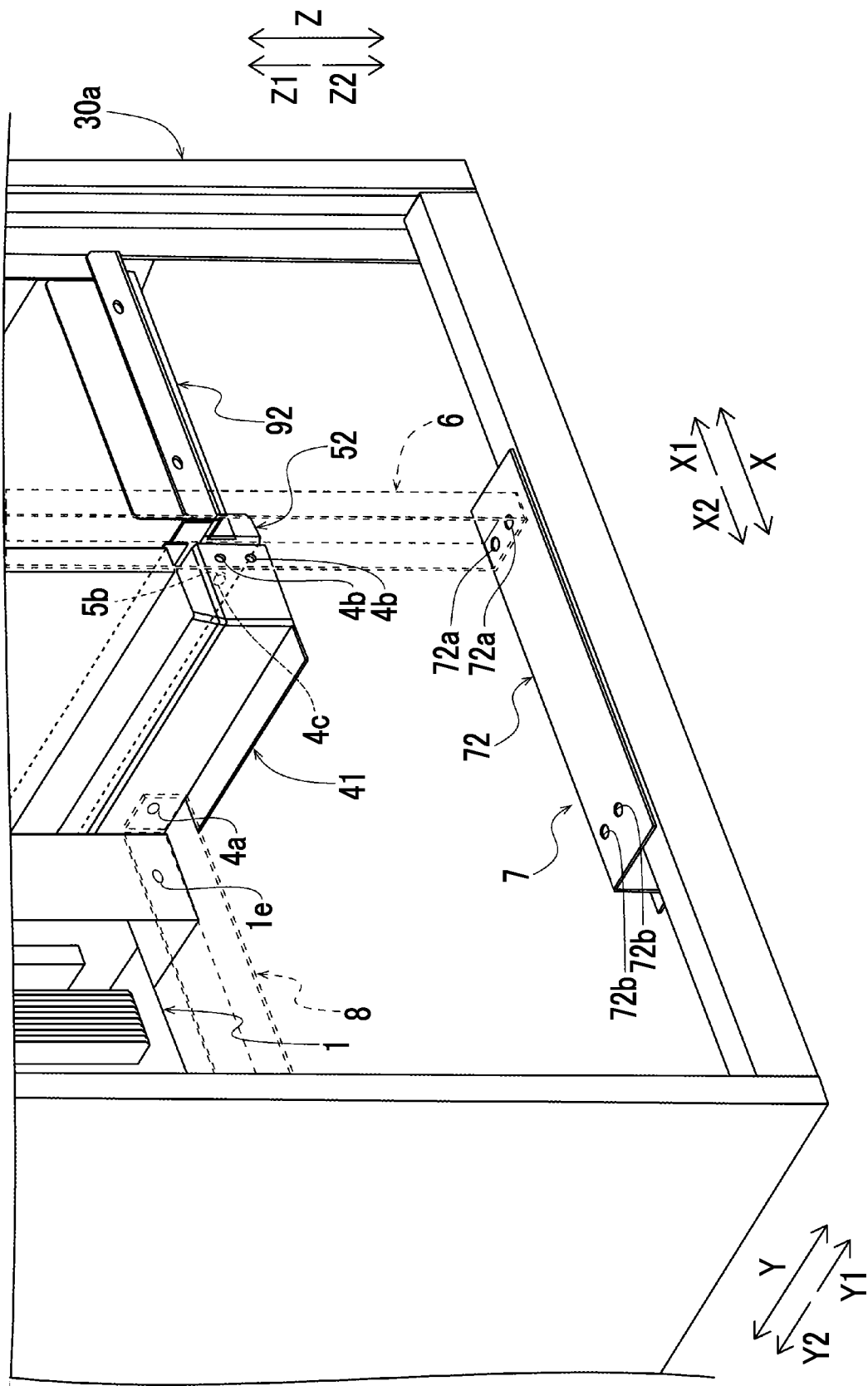
FIG. 13 is a second perspective view showing the configuration of the left-right position change portion provided on the lower portion of the housing of the control module according to one embodiment of the present invention.

Specifically, as shown in FIG. 13, the second portion 52 of the second support member 5 is provided with a fastening hole portion 5b on the surface on the side of the first support member 4. Further, the first portion 41 of the first support member 4 is provided with a fastening hole portion 4c on the surface on the side of the second support member 5. The second portion 52 of the second support member 5 is fastened and fixed to the first support member 4 (first portion 41) attached to the support member attachment portion 6, by using the fastening hole portion 5b and the fastening hole portion 4c.

Figure 14:
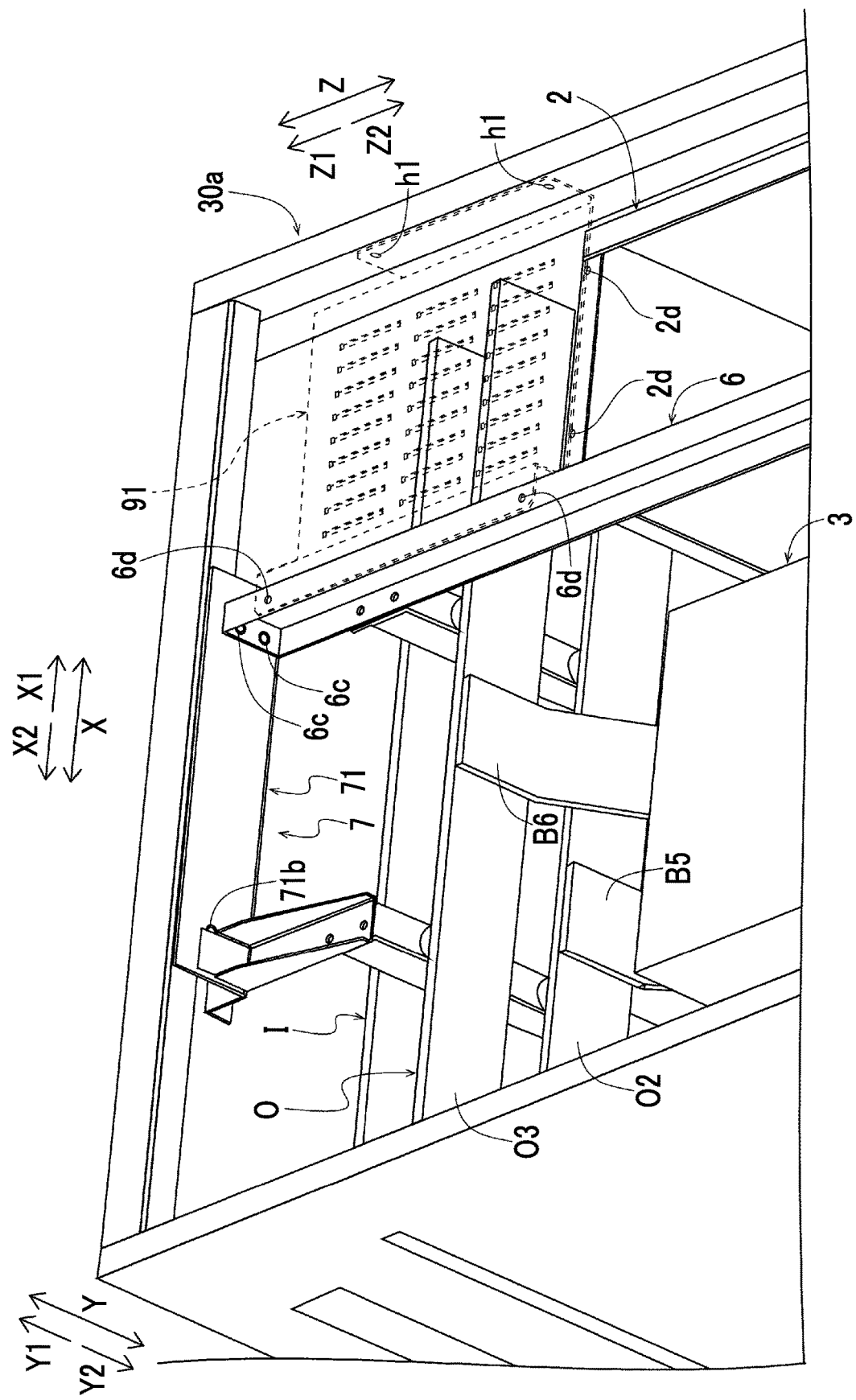
FIG. 14 is a first perspective view showing a configuration of a left-right position change portion provided on an upper portion of the housing of the control module according to one embodiment of the present invention.
Figure 15:
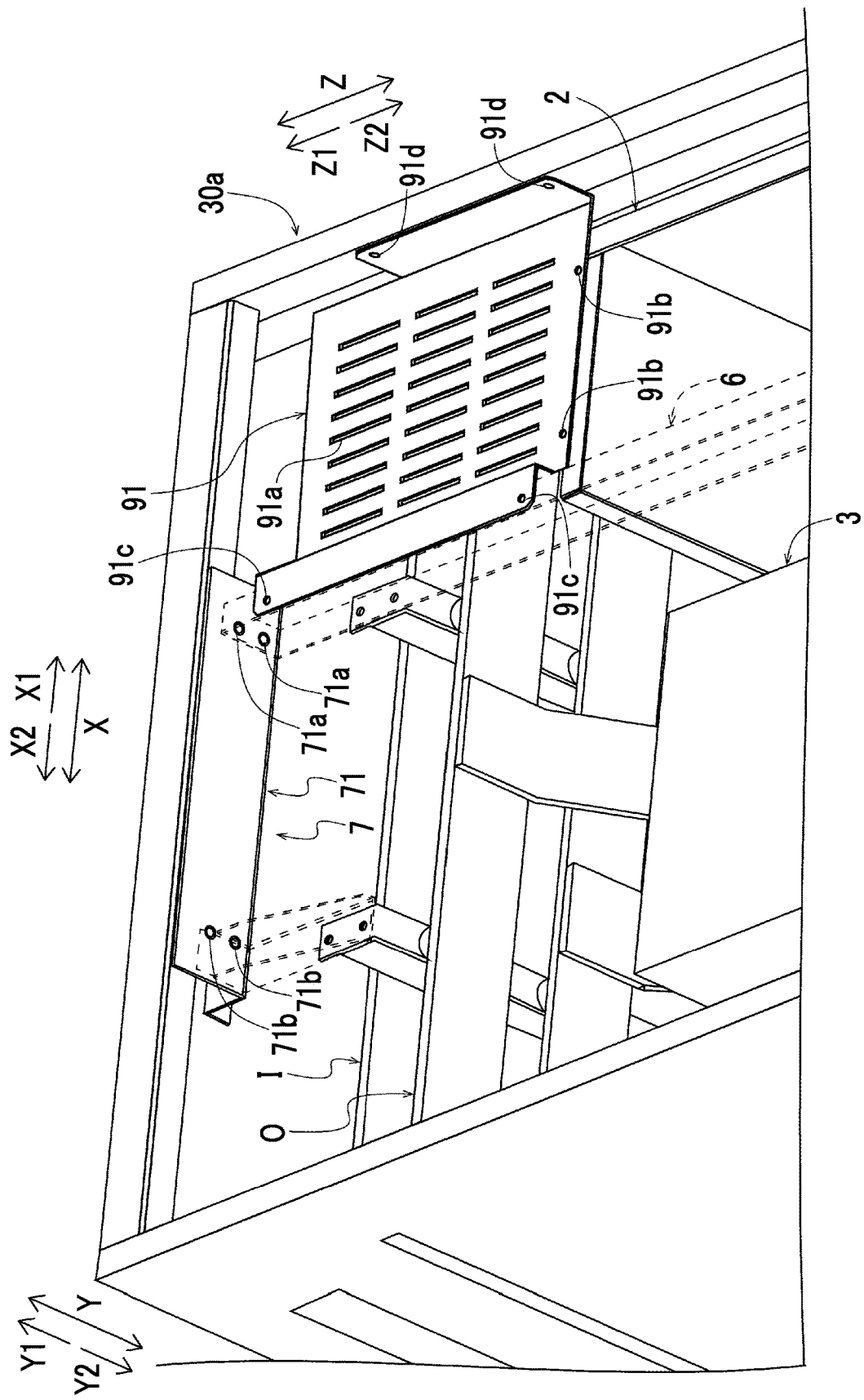
FIG. 15 is a second perspective view showing the configuration of the left-right position change portion provided on the upper portion of the housing of the control module according to one embodiment of the present invention.

As shown in FIG. 14, a fastening hole portion 6c is provided on the upper side of the support member attachment portion 6. Further, as shown in FIG. 15, the left-right position change portion 71 is provided with a fastening hole portion 71a at the first position on one side (right side) in the left-right direction (X direction), and is provided with a fastening hole portion 71b at the second position on the other side (left side) in the left-right direction (X direction). Then, in the control module 31, the support member attachment portion 6 is fastened and fixed to the left-right position change portion 71 by using the fastening hole portion 6c (see FIG. 14) and the fastening hole portion 71a (see FIG. 15) provided at the first position on one side (right side) in the left-right direction (X direction).

Further, in the control module 30 (control module 31), the restriction member 91 is fastened and fixed to each of the control unit 2, the support member attachment portion 6, and the housing 30a by using fastening hole portions 91b, 91c, and 91d (see FIG. 15) provided in the restriction member 91.

The restriction member 91 is fastened and fixed to the control unit 2 by using the fastening hole portion 2d (see FIG. 14) provided in the control unit 2 and the fastening hole portion 91b (see FIG. 15). Further, the restriction member 91 is fastened and fixed to the support member attachment portion 6 by using a fastening hole portion 6d (see FIG. 14) provided in the support member attachment portion 6 and the fastening hole portion 91c (see FIG. 15). Further, the restriction member 91 is fastened and fixed to the housing 30a by using a fastening hole portion h1 (see FIG. 14) provided in the housing 30a and the fastening hole portion 91d (see FIG. 15). With this, the restriction member 91 is fastened and fixed to each of the control unit 2, the support member attachment portion 6, and the housing 30a, so that the movement of the control unit 2 to the front surface side of the housing 30a of the control module 30 (control module 31) is restricted.

The left-right position change portion 7 (left-right position change portions 71 and 72) is configured such that the position of the support member attachment portion 6 in the left-right direction is changeable between the first position on one side (right side) in the left-right direction (X direction) and the second position on the other side (left side) in the left-right direction.

Specifically, as described above, in the left-right position change portion 7, the support member attachment portion 6 is fastened and fixed to the left-right position change portion 7 by using the fastening hole portion 71a (see FIG. 15) provided at the first position of the left-right position change portion 71 and the fastening hole portion 72a (see FIG. 13) provided at the first position of the left-right position change portion 72, whereby the support member attachment portion 6 can be disposed at the first position. Further, in the left-right position change portion 7, the support member attachment portion 6 is fastened and fixed by using the fastening hole portion 71b (see FIG. 15) provided at the second position of the left-right position change portion 71 and the fastening hole portion 72b (see FIG. 13) provided at the second position of the left-right position change portion 72, whereby the support member attachment portion 6 can be disposed at the second position.

(Interchange of Arrangement positions of Thyristor Unit and Control Unit)

The control module 30 is configured such that at least the arrangement positions of the thyristor unit 1 and the control unit 2 are interchangeable in the left-right direction, in the housing 30a.

Figure 16:
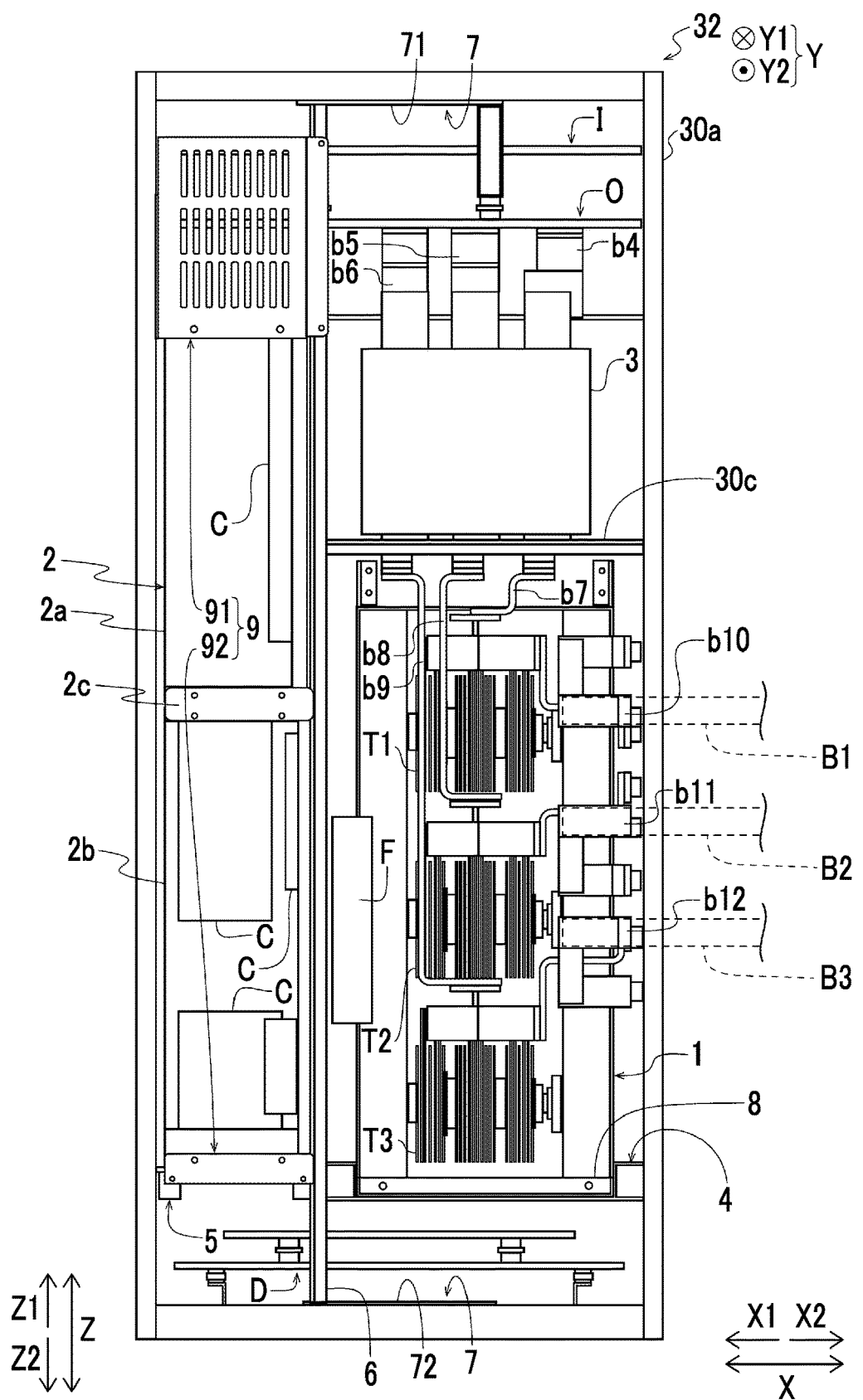
FIG. 16 is a front view showing a configuration inside the housing of the control module on the Y2 direction side.

The arrangement positions of the thyristor unit 1 and the control unit 2 are interchanged in the left-right direction, whereby the control module 31 (see FIG. 6) can be used as the control module 32 (see FIG. 16). That is, the thyristor unit 1 and the control unit 2 housed in the housing 30a of the control modules 31 and 32 are units having the same configuration.

In the control module 32 shown in FIG. 16, wiring lines connected to the thyristor unit 1 are changed from the conductor wiring lines B7 to B12 to conductor wiring lines b7 to b12, respectively, in order to connect the wiring lines to the input module 20 (input module 22) provided on the right side (X2 direction side), when viewed from the front surface side (Y2 direction side) of the housing 30a. Similarly, wiring lines that connect the circuit breaker 3 and the AC output bus O are changed from the conductor wiring lines B4 to B6 to conductor wiring lines b4 to b6.

In the control module 32 shown in FIG. 16, the circuit breaker 3 is electrically connected to each of the AC output buses O1, O2, and O3 via the conductor wiring lines b4, b5, and b6. The circuit breaker 3 is electrically connected to each of the thyristors T1, T2, and T3 via the conductor wiring lines b7, b8, and b9. Further, the plurality of thyristors T (thyristors T1 to T3) of the thyristor unit 1 are electrically connected to the bypass wiring lines B1, B2, and B3 of the input module 21 (input module 20) via conductor wiring lines b10, b11, and b12, respectively. The conductor wiring lines b4 to b12 include, for example, copper bars.

In the present embodiment, the arrangement positions of the thyristor unit 1 and the control unit 2 in the housing 30a are interchangeable such that the thyristor unit 1 is disposed on the side of the input module 20 (the side of the input module 21 or 22), in the housing 30a of the control module 30.

In the control module 30, the position of the support member attachment portion 6 is changed by using the left-right position change portion 7, and then the positions of the first support member 4, the second support member 5, the partition plate 30b, and the partition plate 30c are changed. With this, the arrangement positions of the thyristor unit 1, the control unit 2, and the circuit breaker 3 can be changed according to the arrangement positions of the first support member 4, the second support member 5, and the partition plate 30c, respectively.

The arrangement positions of the thyristor unit 1 and the control unit 2 in the housing 30*a* are interchangeable such that the thyristor unit 1 is disposed on the side of the input module 20 in a state in which the plurality of thyristors T (thyristors T1 to T3) is arranged in the up-down direction, in the housing 30*a* of the control module 30.

In the control module 30, since the arrangement position of the entire thyristor unit 1 is changed when the arrangement positions are interchanged, the arrangement position of the thyristor unit 1 and the arrangement position of the control unit 2 can be interchanged in a state in which the plurality of thyristors T (thyristors T1 to T3) is arranged in the up-down direction.

In the present embodiment, as shown in FIGS. 6 and 16, the arrangement position of the circuit breaker 3 in the housing 30*a* of the control module 30 is changeable such that the circuit breaker 3 is disposed above the plurality of thyristors T (thyristors T1 to T3) of the thyristor unit 1 and on the side of the input module 20 with respect to the control unit 2.

In the present embodiment, the partition plate 30*c* is disposed above the thyristor unit 1 (see FIGS. 6 and 16) as described above. The partition plate 30*c* is provided on the side of the input module 20 with respect to the support member attachment portion 6. The partition plate 30*c* and the second support member 5 that supports the control unit 2 are disposed so as to sandwich the support member attachment portion 6 therebetween in the left-right direction (X direction), as shown in FIGS. 6 and 16. As described above, since the circuit breaker 3 is placed on the upper surface of the partition plate 30*c* and is fastened and fixed to the upper surface of the partition plate 30*c*, the circuit breaker 3 is disposed above the plurality of thyristors T (thyristors T1 to T3) of the thyristor unit 1 and on the side of the input module 20 with respect to the control unit 2 even in a case where the arrangement position is changed in any direction in the left-right direction (X direction).

Further, in the present embodiment, in a case where the input module 20 is disposed on one side in the left-right direction (X direction) of the control module 30, the position of the support member attachment portion 6 is changed to the second position. Specifically, since the thyristor unit 1 having a width larger than that of the control unit 2 is disposed on the right side in a case where the input module 20 (input module 22) is disposed on the right side (one side) when viewed from the front surface side of the housing 30*a* as in the control module 32 (see FIG. 16), the position of the support member attachment portion 6 is changed to the second position which is the position on the left side when viewed from the front surface side of the housing 30*a*.

Further, in a case where the input module 20 is disposed on the other side in the left-right direction (X direction) of the control module 30, the position of the support member attachment portion 6 is changed to the first position. Specifically, since the thyristor unit 1 having a width larger than that of the control unit 2 is disposed on the left side in a case where the input module 20 (input module 21) is disposed on the left side (the other side) when viewed from the front surface side of the housing 30*a* as in the control module 31 (see FIG. 6), the position of the support member attachment portion 6 is changed to the first position which is the position on the right side when viewed from the front surface side of the housing 30*a*.

In the present embodiment, when the arrangement positions of the thyristor unit 1 and the control unit 2 in the housing 30*a* of the control module 30 are interchanged, the position of the support member attachment portion 6 is changed to the first position or the second position and the thyristor unit 1 is slidably moved in the direction (Y direction) along the direction in which the front surface side and the rear surface side of the housing 30*a* face each other, on the first support member 4, so that the arrangement positions of the thyristor unit 1 are interchangeable.

As described above, in the control module 30, the position of the support member attachment portion 6 is changed to the first position or the second position, whereby the position of the first support member 4 is changeable. Then, the control module 30 is configured such that, after the position of the first support member 4 is changed, the thyristor unit 1 is slidably moved to the rear surface side of the housing 30*a* in a state in which the thyristor unit 1 is supported by the first support member 4, which is formed so as to extend along the Y direction, so that the thyristor unit 1 can be housed in the housing 30*a*.

Further, the control module 30 is configured such that, before the position of the support member attachment portion 6 is changed to the first position or the second position, the thyristor unit 1 is slidably moved to the front surface side of the housing 30*a* in a state in which the thyristor unit 1 is supported by the first support member 4, which is formed so as to extend along the Y direction, so that the thyristor unit 1 can be taken out from the housing 30*a*.

Further, the first restriction member 8 restricts the movement of the thyristor unit 1 to the front surface side of the housing 30*a* of the control module 30 after the arrangement positions of the thyristor unit 1 and the control unit 2 in the housing 30*a* of the control module 30 are interchanged (after the thyristor unit 1 is housed in the housing 30*a*).

Specifically, as described above, the first restriction member 8 provided on the front surface side of the housing 30*a* of the control module 30 (control modules 31 and 32) with respect to the thyristor unit 1 is fastened and fixed to the thyristor unit 1 and the first support member 4. With this, the first restriction member 8 is attached after the arrangement positions of the thyristor unit 1 and the control unit 2 are interchanged, whereby the movement of the thyristor unit 1 to the front surface side of the housing 30*a* is restricted.

Further, when the arrangement positions of the thyristor unit 1 and the control unit 2 in the housing 30*a* of the control module 30 are interchanged, the position of the support member attachment portion 6 is changed to the first position or the second position and the control unit 2 is slidably moved in the direction (Y direction) along the direction in which the front surface side and the rear surface side of the housing 30*a* face each other, on the second support member 5, so that the arrangement positions of the control unit 2 are interchangeable.

As described above, in the control module 30, the position of the support member attachment portion 6 is changed to the first position or the second position, whereby the position of the second support member 5 is changeable. Then, the control module 30 is configured such that, after the position of the second support member 5 is changed, the control unit 2 is slidably moved to the rear surface side of the housing 30*a* in a state in which the control unit 2 is supported by the second support member 5, which is formed so as to extend along the Y direction, so that the control unit 2 can be housed in the housing 30*a*.

Further, the control module 30 is configured such that, before the position of the support member attachment portion 6 is changed to the first position or the second position, the control unit 2 is slidably moved to the front surface side of the housing 30*a* in a state in which the control unit 2 is supported by the second support member 5, which is formed so as to extend along the Y direction, so that the control unit 2 can be taken out from the housing 30a.

Further, the second restriction member 9 (restriction members 91 and 92) is configured to restrict the movement of the control unit 2 to the front surface side of the housing 30a of the control module 30 after the arrangement positions of the thyristor unit 1 and the control unit 2 in the housing 30a of the control module 30 are interchanged (after the control unit 2 is housed in the housing 30a).

Specifically, as described above, the restriction member 91 provided on the front surface side of the housing 30a of the control module 30 (control modules 31 and 32) with respect to the control unit 2 is fastened and fixed to each of the control unit 2, the support member attachment portion 6, and the housing 30a. With this, the restriction member 91 is attached after the arrangement positions of the thyristor unit 1 and the control unit 2 are interchanged, whereby the movement of the control unit 2 to the front surface side of the housing 30a is restricted.

Further, as described above, the restriction member 92 provided on the front surface side of the housing 30a of the control module 30 (control modules 31 and 32) with respect to the control unit 2 is fastened and fixed to each of the control unit 2 and the second support member 5. With this, the restriction member 92 is attached after the arrangement positions of the thyristor unit 1 and the control unit 2 are interchanged, whereby the movement of the control unit 2 to the front surface side of the housing 30a is restricted.

(Effect of Present Embodiment)

In the present embodiment, the following effects can be obtained.

In the present embodiment, the control module 30 is disposed in the left-right direction of the input module 20 that inputs the power received from the AC power supply for bypass power supply 104 provided outside the apparatus to the plurality of thyristors T (thyristors T1 to T3). The control module 30 is configured such that at least the arrangement positions of the thyristor unit 1 and the control unit 2 are interchangeable in the left-right direction, in the housing 30a. With this, since the arrangement positions of the thyristor unit 1 and the control unit 2 can be interchanged in the left-right direction, the thyristor unit 1 can be disposed on the side close to the input module 20. Therefore, the thyristor unit 1 having the plurality of thyristors T (thyristors T1 to T3) can be disposed on the side on which the input module 20 that inputs the power received from the AC power supply for bypass power supply 104 provided outside the apparatus to the plurality of thyristors T (Thyristors T1 to T3) is disposed, regardless of whether the input module 20 is disposed on the left or right side of the control module 30. As a result, it is possible to make the wiring lines (conductor wiring lines B10, B11, B12, b10, b11, and b12) more compact by restraining the lengths of the wiring lines that connect the thyristors T (thyristors T1 to T3) and the wiring lines (bypass wiring lines B1, B2, and B3) provided inside the input module 20 and electrically connected to the AC power supply for bypass power supply 104 from increasing, regardless of whether the input module 20 (input modules 21 and 22) is disposed on the left or right side of the control module 30 in which the thyristors T (thyristors T1 to T3) are housed.

Further, in the present embodiment, as described above, the arrangement positions of the thyristor unit 1 and the control unit 2 in the housing 30a are interchangeable such that the thyristor unit 1 is disposed on the side of the input module 20, in the housing 30a of the control module 30. With this, since the arrangement positions can be interchanged such that the thyristor unit 1 is disposed on the side of the input module 20, in the housing 30a of the control module 30, the thyristor unit 1 having the plurality of thyristors T (thyristors T1 to T3) can be disposed on the side on which the input module 20 is disposed, regardless of whether the control module 30 is disposed on the left or right side of the input module 20. As a result, it is possible to make the wiring lines (conductor wiring lines B10, B11, B12, b10, b11, and b12) more compact by restraining the lengths of the wiring lines that connect the plurality of thyristors T (thyristors T1 to T3) and the wiring lines (bypass wiring lines B1, B2, and B3) provided inside the input module 20 (input modules 21 and 22) and electrically connected to the AC power supply for bypass power supply 104 from increasing.

Further, in the present embodiment, as described above, the arrangement positions of the thyristor unit 1 and the control unit 2 in the housing 30a are interchangeable such that the thyristor unit 1 is disposed on the side of the input module 20 in a state in which the plurality of thyristors T (thyristors T1 to T3) is arranged in the up-down direction, in the housing 30a of the control module 30. With this, since the plurality of thyristors T (thyristors T1 to T3) is disposed on the side of the input module 20 in a state in which the plurality of thyristors T (thyristors T1 to T3) is arranged in the up-down direction, in the housing 30a of the control module 30, all the thyristors T (thyristors T1 to T3) can be brought close to the input module 20, unlike a case where the plurality of thyristors T (thyristors T1 to T3) is disposed on the side of the input module 20 in a state in which the plurality of thyristors T (thyristors T1 to T3) is arranged in the left-right direction. As a result, it is possible to make the wiring lines (conductor wiring lines B10, B11, B12, b10, b11, and b12) more compact by restraining the lengths of the wiring lines between all the thyristors T (thyristors T1 to T3) provided in the thyristor unit 1 and the wiring lines (bypass wiring lines B1, B2, and B3) provided inside the input module 20 and electrically connected to the AC power supply for bypass power supply 104 from increasing. Further, since the plurality of thyristors T (thyristors T1 to T3) is disposed on the side of the input module 20 in a state in which the plurality of thyristors T (thyristors T1 to T3) is arranged in the up-down direction, in the housing 30a of the control module 30, it is possible to restrain the width of the control module 30 in the left-right direction from increasing, unlike a case where the plurality of thyristors T (thyristors T1 to T3) is disposed on the side of the input module 20 in a state in which the plurality of thyristors T (thyristors T1 to T3) is arranged in the left-right direction. As a result, the installation length of the control module 30 in the left-right direction (X direction) can be reduced.

Further, in the present embodiment, as described above, the arrangement position of the circuit breaker 3 in the housing 30a of the control module 30 is changeable such that the circuit breaker 3 is disposed above the plurality of thyristors T (thyristors T1 to T3) of the thyristor unit 1 and on the side of the input module 20 with respect to the control unit 2. With this, it is possible to make the wiring lines (conductor wiring lines B4, B5, B6, b4, b5, and b6) more compact by restraining the lengths of the wiring lines that connect the circuit breaker 3 and the plurality of thyristors T (thyristors T1 to T3) from increasing, as compared with a case where the control unit 2 is disposed between the circuit breaker 3 and the plurality of thyristors T (thyristors T1 to T3).

Further, in the present embodiment, as described above, the control unit 2 includes a plurality of control boards C aligned in the up-down direction and is configured to have the width W1 in the left-right direction smaller than the width W2 of the thyristor unit 1 in the left-right direction. With this, since the width W2 of the control unit 2 in the left-right direction is smaller than the width W1 of the thyristor unit 1 in the left-right direction, it is possible to restrain the width of the control module 30 in the left-right direction (X direction) from increasing. As a result, the installation length of the control module 30 in the left-right direction can be reduced. Further, since the plurality of control boards C is aligned in the up-down direction in the control unit 2, it is possible to easily restrain the width W2 of the control unit 2 from increasing, as compared with a case where the plurality of control boards C is aligned in the left-right direction.

Further, in the present embodiment, as described above, the left-right position change portion 7 capable of changing the position of the support member attachment portion 6 in the left-right direction between the first position on one side in the left-right direction and the second position on the other side in the left-right direction is provided. The position of the support member attachment portion 6 is changed to the second position in a case where the input module 20 is disposed on one side in the left-right direction of the control module 30, and the position of the support member attachment portion 6 is changed to the first position in a case where the input module 20 is disposed on the other side in the left-right direction of the control module 30. With this, the position of the support member attachment portion 6 is changed to the first position or the second position by the left-right position change portion 7, so that it is possible to change the position of the first support member 4 (the first portion 41 or the second portion 42) on the side of the uninterruptible power supply module 10. As a result, since the position of the first support member 4 (the first portion 41 or the second portion 42) on the side of the uninterruptible power supply module 10 can be changed even in a case where the width W1 of the thyristor unit 1 and the width W2 of the control unit 2 are different from each other, the arrangement positions of the thyristor unit 1 and the control unit 2 can be easily interchanged.

Further, in the present embodiment, as described above, when the arrangement positions of the thyristor unit 1 and the control unit 2 in the housing 30a of the control module 30 are interchanged, the position of the support member attachment portion 6 is changed to the first position or the second position and the thyristor unit 1 is slidably moved in the direction (Y direction) along the direction in which the front surface side and the rear surface side of the housing 30a face each other, on the first support member 4, so that the arrangement position of the thyristor unit 1 is interchangeable. With this, the thyristor unit 1 is slidably moved in the direction (Y direction) along the direction in which the front surface side and the rear surface side of the housing 30a of the control module 30 face each other, on the first support member 4, so that the thyristor unit 1 can be easily housed in the housing 30a of the control module 30 or the thyristor unit 1 can be easily taken out from the inside of the housing 30a of the control module 30. As a result, the arrangement position of the thyristor unit 1 can be easily interchanged in the housing 30a of the control module 30.

Further, in the present embodiment, as described above, the control module 30 includes the first restriction member 8 provided on the front surface side of the housing 30a of the control module 30 with respect to the thyristor unit 1. Then, the first restriction member 8 restricts the movement of the thyristor unit 1 to the front surface side of the housing 30a of the control module 30 after the arrangement positions of the thyristor unit 1 and the control unit 2 in the housing 30a of the control module 30 are interchanged. With this, it is possible to prevent the thyristor unit 1 housed in the housing 30a of the control module 30 from moving to the front surface side of the housing 30a of the control module 30 after the arrangement positions of the thyristor unit 1 and the control unit 2 in the housing 30a of the control module 30 are interchanged (after the thyristor unit 1 is housed in the housing 30a of the control module 30).

Further, in the present embodiment, as described above, the side of the second support member 5 (the first portion 51 or the second portion 52) on the side of the input module in the left-right direction is attached to the support member attachment portion 6 via the first support member 4. When the arrangement positions of the thyristor unit 1 and the control unit 2 in the housing 30a of the control module 30 are interchanged, the position of the support member attachment portion 6 is changed to the first position or the second position and the control unit 2 is slidably moved in the direction along the direction in which the front surface side and the rear surface side of the housing 30a face each other, on the second support member 5, so that the arrangement position of the control unit 2 are interchangeable. With this, the position of the support member attachment portion 6 is changed to the first position or the second position by the left-right position change portion 7, so that it is possible to change the position of the second support member 5 (the first portion 51 or the second portion 52) on the side of the input module 20 where the second support member 5 is attached to the support member attachment portion 6 via the first support member 4. As a result, since the position of the second support member 5 (the first portion 51 or the second portion 52) on the side of the input module 20 where the second support member 5 is attached to the support member attachment portion 6 via the first support member 4 can be changed even in a case where the width W1 of the thyristor unit 1 and the width W2 of the control unit 2 are different from each other, the arrangement positions of the thyristor unit 1 and the control unit 2 can be easily interchanged. Further, the control unit 2 is slidably moved in the direction (Y direction) along the direction in which the front surface side and the rear surface side of the housing 30a of the control module 30 face each other, on the second support member 5, so that the control unit 2 can be easily housed in the housing 30a of the control module 30 or the control unit 2 can be easily taken out from the housing 30a of the control module 30. As a result, the arrangement position of the control unit 2 can be easily interchanged in the housing 30a of the control module 30.

Further, in the present embodiment, as described above, the control module 30 includes the second restriction member 9 provided on the front surface side of the housing 30a of the control module 30 with respect to the control unit 2. Then, the second restriction member 9 restricts the movement of the control unit 2 to the front surface side of the housing 30a of the control module 30 after the arrangement positions of the thyristor unit 1 and the control unit 2 in the housing 30a of the control module 30 are interchanged. With this, it is possible to prevent the control unit 2 housed in the housing 30a of the control module 30 from moving to the front surface side of the housing 30a of the control module 30 after the arrangement positions of the thyristor unit 1 and the control unit 2 in the housing 30a of the control module 30 are interchanged (after the control unit 2 is housed in the housing 30a of the control module 30).

Modification Example

The embodiments disclosed herein should be considered an example and not restrictive in all respects. The scope of the present invention is shown by the claims, not the description of the above-described embodiment, and includes all modifications (modification examples) within the meaning and scope equivalent to the claims.

Figure 17:
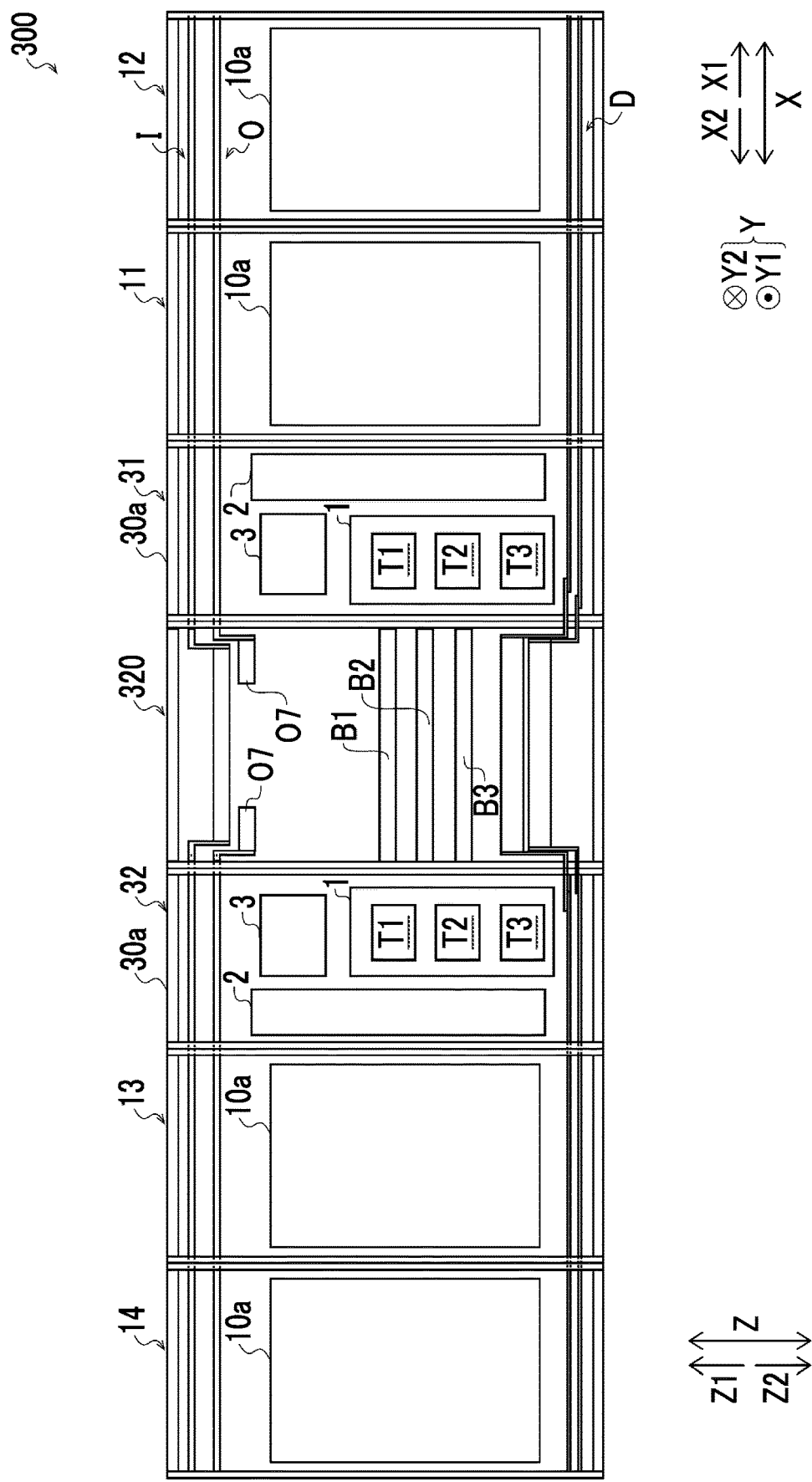
FIG. 17 is a view showing a modification example of an uninterruptible power supply apparatus according to one embodiment of the present invention.

For example, in the above embodiment, an example has been shown in which the rear surface side of the input module 21 and the rear surface side of the input module 22 are disposed so as to face each other in the Y direction, and the rear surface side of the control module 31 and the rear surface side of the control module 32 are disposed so as to face each other in the Y direction, but the present invention is not limited thereto. For example, as in an uninterruptible power supply apparatus 300 of the modification example shown in FIG. 17, the control module 31, the uninterruptible power supply module 11, and the uninterruptible power supply module 12 may be disposed on one side (X1 direction side) in the left-right direction (X direction) of an input module 320, and the control module 32, the uninterruptible power supply module 13, and the uninterruptible power supply module 14 may be disposed on the other side (X2 direction side). In this case, in the uninterruptible power supply apparatus 300, an AC output wiring line O7 electrically connected to the AC output bus O (buses O1 to O6) is provided in the input module 320, and power (AC power or DC power) converted by the power conversion unit 10a is output to the load 102 (see FIG. 4) via the AC output wiring line O7. That is, the input module 320 is an input/output module that inputs and outputs power. The same configurations as those in the above embodiments are designated by the same reference numerals, and the description thereof will be omitted.

Further, in the above embodiment, an example has been shown in which the uninterruptible power supply apparatus 100 includes four uninterruptible power supply modules 10 (uninterruptible power supply modules 11 to 14), but the present invention is not limited thereto. In the present invention, the uninterruptible power supply apparatus may include one or more and three or less uninterruptible power supply modules, or five or more uninterruptible power supply modules.

Further, in the above embodiment, an example has been shown in which the uninterruptible power supply apparatus 100 includes two input modules 20 (input modules 21 and 22), but the present invention is not limited thereto. In the present invention, the uninterruptible power supply apparatus may include only one input module, or three or more input modules.

Further, in the above embodiment, an example has been shown in which the uninterruptible power supply apparatus 100 includes two control modules 30 (control modules 31 and 32), but the present invention is not limited thereto. In the present invention, the uninterruptible power supply apparatus may include only one control module, or three or more control modules.

Further, in the above embodiment, an example has been shown in which the arrangement positions of the thyristor unit 1 and the control unit 2 in the housing 30a are interchangeable such that the thyristor unit 1 is disposed on the side of the input module 20 in a state in which the plurality of thyristors T (thyristors T1 to T3) is arranged in the up-down direction, in the housing 30a of the control module 30, but the present invention is not limited thereto. In the present invention, the arrangement positions of the thyristor unit and the control unit in the housing may be interchangeable such that the thyristor unit is disposed on the side of the input module in a state in which the plurality of thyristors is arranged in the left-right direction.

Further, in the above embodiment, an example has been shown in which the arrangement position of the circuit breaker 3 in the housing 30a of the control module 30 is changeable such that the circuit breaker 3 is disposed above the plurality of thyristors T (thyristors T1 to T3) of the thyristor unit 1 and on the side of the input module 20 with respect to the control unit 2, but the present invention is not limited thereto. In the present invention, the circuit breaker may be disposed below the thyristor unit.

Further, in the above embodiment, an example has been shown in which the width W2 of the control unit 2 in the left-right direction is smaller than the width W1 of the thyristor unit 1, but the present invention is not limited thereto. In the present invention, the width of the thyristor unit and the width of the control unit may be substantially the same, or the width of the thyristor unit may be smaller than the width of the control unit.

Further, in the above embodiment, an example has been shown in which the left-right position change portion 7 capable of changing the position of the support member attachment portion 6 in the left-right direction between the first position on one side in the left-right direction and the second position on the other side in the left-right direction is provided, but the present invention is not limited thereto. In the present invention, the thyristor unit and the control unit may have the same width, and the position of the support member attachment portion in the left-right direction may not be changed. Further, the left-right position change portion may be capable of changing the position of the support member attachment portion in the left-right direction to three or more positions.

Further, in the above embodiment, an example has been shown in which the control module 30 includes the first restriction member 8 provided on the front surface side of the housing 30a of the control module 30 with respect to the thyristor unit 1, but the present invention is not limited thereto. In the present invention, the thyristor unit may be fixed on the side surface side or the rear surface side of the thyristor unit without the first restriction member provided on the front surface side of the housing of the control module, whereby the movement of the thyristor unit to the front surface side of the housing of the control module may be restricted.

Further, in the above embodiment, an example has been shown in which the control module 30 includes the second restriction member 9 provided on the front surface side of the housing 30a of the control module 30 with respect to the control unit 2, but the present invention is not limited thereto. In the present invention, the control unit may be fixed on the side surface side or the rear surface side of the control unit without the second restriction member provided on the front surface side of the housing of the control module, whereby the movement of the control unit to the front surface side of the housing of the control module may be restricted.

Further, in the above embodiment, an example has been shown in which the control module 30 (control device for an uninterruptible power supply apparatus) including the thyristor unit 1 and the control unit 2 is a module different from the uninterruptible power supply module 10 including the power conversion unit 10a, but the present invention is not limited thereto. In the present invention, the control device for an uninterruptible power supply apparatus may be integrally formed with the uninterruptible power supply module. Alternatively, the uninterruptible power supply apparatus may include both an uninterruptible power supply module that does not include a control device for an uninterruptible power supply apparatus and a module in which a control device for an uninterruptible power supply apparatus and an uninterruptible power supply module are integrally formed.

Further, in the above embodiment, an example has been shown in which the power output from the uninterruptible power supply apparatus 100 is input (supplied) to the load 102 (loads 102a to 102c) via the output branch board 200, but the present invention is not limited thereto. In the present invention, the power output from the uninterruptible power supply apparatus may be input (supplied) to the load via an output (input/output) module or the uninterruptible power supply module disposed on the outermost side in the left-right direction of the uninterruptible power supply apparatus, instead of via the output branch board.

What is claimed is:

1. An uninterruptible power supply apparatus comprising:
   an uninterruptible power supply module that includes a power conversion unit which converts power received from an AC power supply provided outside the apparatus;
   an input module that inputs power received from an AC power supply for bypass power supply provided outside the apparatus to a plurality of thyristors that is provided so as to correspond to respective phases of the power received from the AC power supply for bypass power supply provided outside the apparatus; and
   a control module that includes
      a thyristor unit which has the plurality of thyristors,
      a control unit which controls power conversion of the uninterruptible power supply module, and
      a housing which houses the thyristor unit and the control unit, and that is disposed in a left-right direction of the input module,
   wherein the control module is configured such that at least arrangement positions of the thyristor unit and the control unit are interchangeable in a left-right direction, in the housing,
   wherein the control module further includes a circuit breaker that is provided in a current path between the plurality of thyristors and the power conversion unit and that interrupts power output from the power conversion unit, and
   an arrangement position of the circuit breaker in the housing of the control module is changeable.

2. The uninterruptible power supply apparatus according to claim 1,
   wherein the control module is disposed between the uninterruptible power supply module and the input module, and
   the arrangement positions of the thyristor unit and the control unit in the housing are interchangeable such that the thyristor unit is disposed on a side of the input module, in the housing of the control module.

3. The uninterruptible power supply apparatus according to claim 2,
   wherein the arrangement positions of the thyristor unit and the control unit in the housing are interchangeable such that the thyristor unit is disposed on a side of the input module in a state in which the plurality of thyristors is arranged in an up-down direction, in the housing of the control module.

4. The uninterruptible power supply apparatus according to claim 3, wherein
   the circuit breaker is disposed above the plurality of thyristors of the thyristor unit and on a side of the input module with respect to the control unit.

5. An uninterruptible power supply apparatus according to claim 1, comprising:
   an uninterruptible power supply module that includes a power conversion unit which converts power received from an AC power supply provided outside the apparatus;
   an input module that inputs power received from an AC power supply for bypass power supply provided outside the apparatus to a plurality of thyristors that is provided so as to correspond to respective phases of the power received from the AC power supply for bypass power supply provided outside the apparatus; and
   a control module that includes
      a thyristor unit which has the plurality of thyristors,
      a control unit which controls power conversion of the uninterruptible power supply module, and
      a housing which houses the thyristor unit and the control unit, and that is disposed in a left-right direction of the input module,
   wherein the control module is configured such that at least arrangement positions of the thyristor unit and the control unit are interchangeable in a left-right direction, in the housing, and
   wherein the control unit includes a plurality of control boards aligned in an up-down direction and is configured to have a smaller width in a left-right direction than a width of the thyristor unit in the left-right direction.

6. The uninterruptible power supply apparatus according to claim 5,
   wherein the control module further includes
      a first support member that supports the thyristor unit,
      a support member attachment portion to which a side of the first support member on a side of the uninterruptible power supply module is attached, and
      a left-right position change portion capable of changing a position of the support member attachment portion in the left-right direction between a first position on one side in the left-right direction and a second position on another side in the left-right direction,
   in a case where the input module is disposed on the one side in the left-right direction of the control module, the position of the support member attachment portion is changed to the second position, and
   in a case where the input module is disposed on the another side in the left-right direction of the control module, the position of the support member attachment portion is changed to the first position.

7. The uninterruptible power supply apparatus according to claim 6,
   wherein when arrangement positions of the thyristor unit and the control unit in the housing of the control module are interchanged, a position of the support member attachment portion is changed to the first position or the second position and the thyristor unit is slidably moved in a direction along a direction in which a front surface side and a rear surface side of the housing face each other, on the first support member, so that arrangement position of the thyristor unit is interchangeable.

8. The uninterruptible power supply apparatus according to claim 7,
   wherein the control module further includes a first restriction member that is provided on the front surface side of the housing of the control module with respect to the thyristor unit, and that restricts movement of the thyristor unit to the front surface side of the housing of the control module after the arrangement positions of the thyristor unit and the control unit in the housing of the control module are interchanged.

9. The uninterruptible power supply apparatus according to claim 8,
wherein the control module further includes a second restriction member that is provided on the front surface side of the housing of the control module with respect to the control unit, and that restricts movement of the control unit to the front surface side of the housing of the control module after the arrangement positions of the thyristor unit and the control unit in the housing of the control module are interchanged.

10. The uninterruptible power supply apparatus according to claim 6,
wherein the control module further includes a second support member that supports the control unit,
a side of the second support member on a side of the input module in the left-right direction is attached to the support member attachment portion via the first support member, and
when the arrangement positions of the thyristor unit and the control unit in the housing of the control module are interchanged, the position of the support member attachment portion is changed to the first position or the second position and the control unit is slidably moved in a direction along a direction in which a front surface side and a rear surface side of the housing face each other, on the second support member, so that arrangement position of the control unit is interchangeable.

11. A control device for an uninterruptible power supply apparatus, comprising:
a thyristor unit that has a plurality of thyristors which is provided so as to correspond to respective phases of power received from an AC power supply for bypass power supply provided outside the apparatus;
a control unit that controls power conversion of an uninterruptible power supply module including a power conversion unit which converts power received from an AC power supply provided outside the apparatus;
a housing that houses the thyristor unit and the control unit; and
a circuit breaker that is provided in a current path between the plurality of thyristors and the power conversion unit and that interrupts power output from the power conversion unit,
wherein the control unit is disposed in a left-right direction of an input module that inputs the power received from the AC power supply for bypass power supply provided outside the apparatus to the plurality of thyristors, and
at least arrangement positions of the thyristor unit and the control unit are interchangeable in a left-right direction, in the housing, and
an arrangement position of the circuit breaker in the housing is changeable.

* * * * *